(12) United States Patent
Vukotic et al.

(10) Patent No.: US 11,346,794 B2
(45) Date of Patent: May 31, 2022

(54) MOUNTING SYSTEM AND SAMPLE HOLDER FOR X-RAY DIFFRACTION APPARATUS

(71) Applicant: PROTO MANUFACTURING LTD., Oldcastle (CA)

(72) Inventors: Vedran Nicholas Vukotic, Windsor (CA); William Boyer, Ypsilanti, MI (US); Mohammed Belassel, Windsor (CA); Alec Iskra, Windsor (CA)

(73) Assignee: PROTO PATENTS LTD., Lasalle (CA)

( * ) Notice: Subject to any disclaimer, the term of this patent is extended or adjusted under 35 U.S.C. 154(b) by 0 days.

(21) Appl. No.: 17/008,837

(22) Filed: Sep. 1, 2020

(65) Prior Publication Data

US 2021/0055236 A1    Feb. 25, 2021

Related U.S. Application Data

(62) Division of application No. 16/324,256, filed as application No. PCT/CA2017/050947 on Aug. 10, 2017, now Pat. No. 10,794,844.

(Continued)

(51) Int. Cl.
*G01N 23/207*   (2018.01)
*G01N 23/20025*   (2018.01)

(52) U.S. Cl.
CPC ..... *G01N 23/20025* (2013.01); *G01N 23/207* (2013.01); *G01N 2223/056* (2013.01); *G01N 2223/1016* (2013.01)

(58) Field of Classification Search
None
See application file for complete search history.

(56) References Cited

U.S. PATENT DOCUMENTS 6,963,316 B1 * 11/2005 Lin ............... H01Q 1/1228
343/882
9,613,728 B2   4/2017 Brauss
(Continued)

FOREIGN PATENT DOCUMENTS

CN   104048978 A   9/2014

OTHER PUBLICATIONS

International Search Report for WO Application No. PCT/CA2017/050947 dated Nov. 16, 2017, 4 pages.

*Primary Examiner* — Hoon K Song
(74) *Attorney, Agent, or Firm* — Warner Norcross + Judd LLP

(57) ABSTRACT

A mounting system and a sample holder for an X-ray diffraction (XRD) apparatus are provided. The mounting system includes a mounting bracket, an attachment module and a biasing assembly. The mounting bracket is mountable to the XRD apparatus and is rotatable about a rotation axis. The mounting bracket includes an abutment structure defining a reference position. The attachment module is mountable onto the mounting bracket at an adjustable attaching position with respect to the reference position. The attachment module comprises an attaching element that is engageable with the abutment structure for abutting the mounting bracket proximate the reference position. The biasing assembly is mounted onto one of the mounting bracket or the attachment module for interlocking the mounting bracket with the attachment module, such that the mounting bracket is blocked in a plane substantially parallel to the rotation axis, thereby allowing the attaching position to be aligned with the rotation axis.

8 Claims, 22 Drawing Sheets

Related U.S. Application Data

(60) Provisional application No. 62/372,930, filed on Aug. 10, 2016.

(56) References Cited

U.S. PATENT DOCUMENTS

| | | |
|---|---|---|
| 2004/0165697 A1 | 8/2004 | Brauss |
| 2004/0184580 A1 | 9/2004 | Brauss |
| 2011/0170671 A1 | 7/2011 | Blyakher et al. |
| 2013/0017125 A1* | 1/2013 | Claeys ............ G01N 23/20033 422/500 |
| 2018/0035523 A1 | 2/2018 | Diehm et al. |
| 2020/0023488 A1 | 1/2020 | Alberti |

* cited by examiner

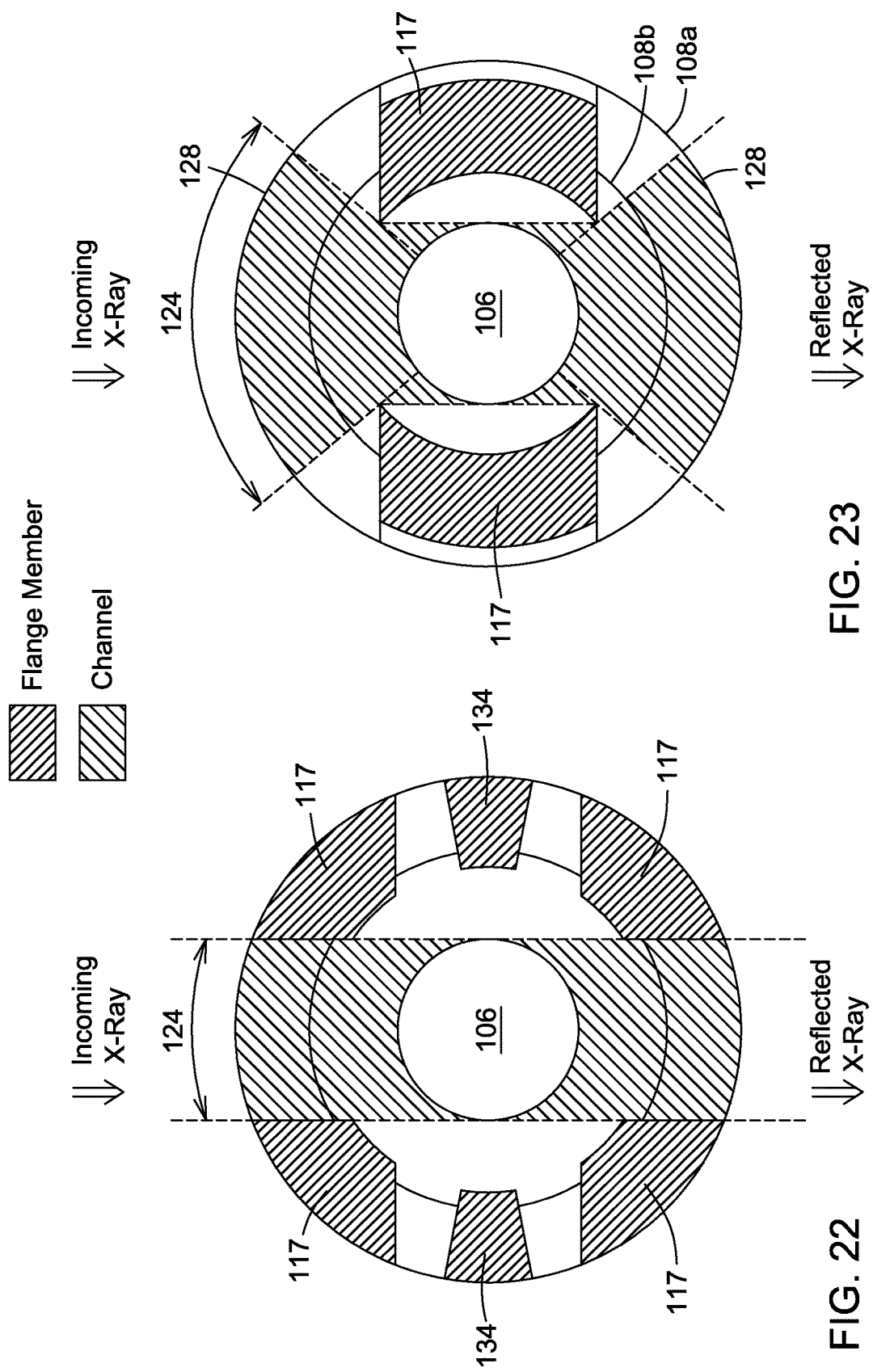

MOUNTING SYSTEM AND SAMPLE HOLDER FOR X-RAY DIFFRACTION APPARATUS

CROSS-REFERENCE TO RELATED APPLICATIONS

This application is a Divisional of U.S. application Ser. No. 16/324,256 filed on 8 Feb. 2019, now U.S. Pat. No. 10,794,884 B2, which is the National Stage of International Application No. PCT/CA2017/050947 filed on 10 Aug. 2017, which claims priority to and all advantages of U.S. Provisional Appl. No. 62/372,930 filed on 10 Aug. 2016, the contents of which are hereby incorporated by reference.

FIELD

The technical field generally relates to X-ray apparatus. More particularly, it relates to a mounting system for such apparatus and to a sample holder for holding a sample in the X-ray apparatus.

BACKGROUND

X-ray powder diffraction is a technique commonly used for determining qualitative and quantitative phase data of a sample, and involves directing an incoming X-ray beam onto a polycrystalline material and recording the diffracted X-ray beam for analysis. In order to conduct an X-ray diffraction experiment, the sample to be analyzed is generally placed on a sample holder which is receivable in part of the X-ray diffractometer. The design of the sample holder is important both for ease of use and for obtaining analytical results of good quality. While many types of sample holders are known, existing sample holders typically exhibit certain shortcomings. For example, reducing background noise at very low reflection angles (e.g., $0°<\theta<3°$) is often challenging. Existing sample holders also tend to significantly contribute to the observed background intensity added to the diffracted peaks of interest, which may be due to scattering of the X-rays caused by the sample holder material near or directly in contact with the sample. There still exist many challenges in terms of sample holders for X-ray diffractometers.

When assessing structural or mechanical properties of the sample, the sample is typically required to be placed at an appropriate height with respect to a center of rotation of a goniometer of the instrument, or with respect with an X-ray source and/or a detector. When a user has to work with multiple attachments or external devices to perform different kinds of measurements, the position of the sample can be altered from one attachment or external device to another, as a consequence of disparity between the manufacturing and assembly tolerances from one manufacturer to another. Furthermore, each attachment or external device typically has different mechanical fixturing. As a result, adjusting the position and aligning the sample can be time-consuming. Challenges still exist in the field of mounting systems for X-ray diffraction apparatuses.

SUMMARY

In some embodiments, a mounting system for an X-ray diffraction apparatus is provided. The mounting system has a rotation axis, and includes: a mounting bracket rotatably mountable onto the X-ray diffraction apparatus, the mounting bracket being rotatable about the rotation axis and including an abutment structure defining a reference position with respect to the rotation axis; an attachment module adjustably mountable onto the mounting bracket at an attaching position, the attaching position being adjustable along one direction normal to the reference position, the attachment module including an attaching element engageable with the abutment structure for abutting the mounting bracket proximate to the reference position; and a biasing assembly mounted onto one of the mounting bracket and the attachment module for interlocking the mounting bracket with the attachment module, such that the mounting bracket is blocked along a plane substantially parallel to the rotation axis, thereby allowing the attaching position to be aligned with the rotation axis along said one direction normal to the reference position.

In some embodiments, the system includes an adjustment mount operatively connected to the attachment module for adjusting the attaching position of the attachment module.

In some embodiments, the adjustment mount has a bottom portion and comprises a micrometer screw mechanically connected with said bottom portion.

In some embodiments, the abutment structure includes: a first abutment element having a vertically-extending portion; and a second abutment element having a horizontally-extending portion.

In some embodiments, the attaching element is matably engageable with at least one of the first and second abutment elements.

In some embodiments, the first abutment element includes a notch and the attaching element includes a recess engageable with the notch.

In some embodiments, the notch is dove-tailed.

In some embodiments, the notch includes a machined inner portion.

In some embodiments, the attaching element includes a snap-lock mechanism cooperating with the mounting bracket.

In some embodiments, the system includes a sample holder mounted onto the attachment module.

In some embodiments, the system includes a non-ambient stage mounted onto the attachment module.

In some embodiments, the biasing mechanism is a lever rotatably mounted onto the mounting bracket.

In some embodiments, the rotation axis passes through a center of rotation of a goniometer.

In some embodiments, a method for mounting a mounting system onto an X-ray diffraction apparatus is provided. The method includes steps of defining a mounting position; providing a mounting bracket proximate the mounting position; rotatably mounting the mounting bracket to the X-ray diffraction apparatus; and affixing the mounting bracket to the X-ray diffraction apparatus.

In some embodiments, the method includes a step of defining a reference position.

In some embodiments, the method includes a step of determining a position of a rotation axis of a goniometer.

In some embodiments, the step of affixing the mounting bracket to the X-ray diffraction apparatus includes mechanically rigidly connecting the mounting bracket with the X-ray diffraction apparatus.

In some embodiments, the method includes steps of providing an attachment module engageable with the mounting bracket; engaging the attachment module with the mounting bracket; interlocking the attachment module and the mounting bracket; and adjusting an attaching position of the attachment module with respect with the reference position.

In some embodiments, a method for aligning an attachment module with a mounting bracket having an abutment structure and being mounted onto an X-ray diffraction apparatus is provided. The method includes steps of mounting a first attachment module having an attaching element onto the mounting bracket; abutting the attaching element to the abutment structure proximate a reference position; interlocking the first attachment module to the mounting bracket; and adjusting an attaching position of the first attachment module with respect with the reference position.

In some embodiments, the interlocking step includes engaging a biasing mechanism with the attaching element or the mounting bracket.

In some embodiments, the method includes steps of unlocking the first attachment module from the mounting bracket; detaching the first attachment module from the mounting bracket; replacing the first attachment module onto the mounting bracket; interlocking the first attachment module to the mounting bracket; and verifying the attaching position of the first attachment module.

In some embodiments, the method includes steps of detaching the first attachment module from the mounting bracket; mounting a second attachment module onto the mounting bracket; abutting the second attachment module to the abutment structure proximate the reference position; interlocking the second attachment module to the mounting bracket; and adjusting an attaching position of the first attachment module with respect with the reference position.

In some embodiments, the interlocking the second attachment module to the mounting bracket step includes engaging a biasing mechanism with the at least one attaching element or the mounting bracket.

In some embodiments, the method includes steps of unlocking the second attachment module from the mounting bracket; detaching the second attachment module from the mounting bracket; replacing the second attachment module onto the mounting bracket; interlocking the second attachment module to the mounting bracket; and verifying the attaching position of the second attachment module.

In some embodiments, there is provided a sample holder and a method of carrying out X-ray diffraction measurements on a sample to be analyzed.

In some embodiments, a sample holder for an X-ray diffraction apparatus is provided. The sample holder includes: an insert including an upper surface and a sample space for holding a sample; and an insert housing, including: a first surface having an outer edge and an inner edge; a second surface opposite to the first surface; a sidewall connecting the first surface to the second surface and forming an opening there between, the opening being adapted to removably receive the insert therein; and a retention assembly for retaining the insert in the opening, the retention assembly including: flange members provided on the first surface and extending above the opening; and a biasing assembly for biasing at least part of the upper surface of the insert against the flange members such that the upper surface of the insert is flush with the first surface, the flange members being positioned with respect to one another so as to define an unobstructed channel extending from a first portion of the outer edge to a second opposed portion of the outer edge.

In some embodiments, the sample space includes a depression defined in the upper surface of the insert.

In some embodiments, the depression has a depth between about 2 mm and 10 mm.

In some embodiments, the sample space is located substantially at the center of the insert.

In some embodiments, the insert housing has an annular shape and the insert has a cylindrical shape.

In some embodiments, the flange members and the upper surface are engaged along at least 50% of the perimeter of the upper surface of the insert, or at three or more widely spaced points of the perimeter of the upper surface of the insert.

In some embodiments, the flange members have a thickness of at least about 1 mm.

In some embodiments, the insert housing is made of metal. In some embodiments, the insert housing is made of plastic, ceramic or a single crystal semiconductor.

In some embodiments, the metal includes at least one of steel, brass and aluminum.

In some embodiments, the channel is defined along a projection path of an incoming X-ray beam from the X-ray diffraction apparatus and a reflection X-ray beam reflected off the sample.

In some embodiments, the flange members are positioned with respect to one another so as to define a second channel extending from a third portion of the outer edge to a fourth portion of the outer edge and through the sample space, such that the upper surface of the insert is flush with the first surface along the second channel.

In some embodiments, an anti-scatter baffle is receivable along the second channel. In some embodiments, an anti-scatter baffle is mountable on top of the flange members, and runs along the length or diameter of the sample holder and of the sample space, above the sample space.

In some embodiments, the anti-scatter baffle is positionable above the upper surface of the insert, for example at a height lower than a height of the second channel.

In some embodiments, an insert housing of a sample holder for an X-ray diffraction apparatus is provided. The insert housing includes: a first surface having an outer edge and an inner edge; a second surface opposite to the first surface; a sidewall connecting the first surface to the second surface and forming an opening there between, the opening being adapted to removably receive an insert therein, the insert including an upper surface and a sample space for holding a sample; and a retention assembly for retaining the insert in the opening, the retention assembly including: flange members provided on the first surface and extending above the opening, the flange members being positioned so as to define a channel extending from a first portion of the outer edge of the first surface to a second opposed portion of the outer edge of the first surface and through the sample space; and a biasing assembly for biasing at least part of the upper surface of the insert against the flange members such that the upper surface of the insert is flush with the first surface at least along the channel.

In some embodiments, an insert is provided which is insertable in a sample holder of an X-ray diffraction apparatus, and includes: an upper surface made of amorphous PVC; and a sample space defined in the upper surface, for holding a sample. In some embodiments, the amorphous polymer is amorphous PVC.

In some embodiments, the insert is made of an amorphous material. In other embodiments, the insert is made of ceramic, a semiconductor material, a metal or a polymer. In some embodiments, the insert is made of a crystalline (polycrystalline or single crystalline) material having an X-ray diffraction signal which does not interfere with the X-ray diffraction signal of the sample to be analyzed. In some embodiments, the insert is made of a single crystalline material which is oriented to avoid background diffraction peaks in directions of interest for the sample.

In some embodiments, an insert insertable in a sample holder of an X-ray diffraction apparatus is provided. The insert includes: an upper surface; a sample space defined in the upper surface, for holding a sample; and a standard reference space defined in the upper surface, for holding a standard reference substance.

In some embodiments, a sample holder for an X-ray diffraction apparatus is provided. The sample holder comprises: an insert comprising an upper surface and a sample space for holding a sample; and an insert housing, comprising: a sidewall defining an opening, the sidewall having a top surface having an outer edge and an inner edge, and a bottom surface opposite the top surface, the opening being adapted to removably receive the insert therein; and a retention assembly for retaining the insert in the opening, the retention assembly comprising: flange members provided on the top surface and extending above the opening; and a biasing assembly for biasing at least part of the upper surface of the insert against the flange members such that the upper surface of the insert is flush with the top surface, the flange members being positioned with respect to one another so as to define an unobstructed channel extending from a first portion of the outer edge to a second opposed portion of the outer edge.

In some embodiments, the sample space comprises a depression defined in the upper surface of the insert.

In some embodiments, the depression has a depth between about 2 mm and 10 mm.

In some embodiments, the sample space is located substantially at the center of the insert.

In some embodiments, the upper surface of the insert has a substantially annular shape.

In some embodiments, the sample space has a substantially circular shape.

In some embodiments, the insert housing has a substantially annular shape and the insert has a substantially cylindrical shape.

In some embodiments, the flange members and the upper surface are engaged along at least 50% of the perimeter of the upper surface of the insert.

In some embodiments, the flange members have a thickness of at least about 1 mm.

In some embodiments, the flange members are substantially flat.

In some embodiments, the flange members have a plate construction.

In some embodiments, the flange members have a substantially annular sector shape.

In some embodiments, the flange members have outer and inner curved edges and side edges, each side edge being substantially parallel with respect to a side edge of an adjacent flange member to define part of the channel.

In some embodiments, each of the flange members comprises an overhang portion configured for abutting against the upper surface of the insert.

In some embodiments, the insert housing is made of metal.

In some embodiments, the metal comprises at least one of steel, brass and aluminum.

In some embodiments, the channel is defined along a projection path of an incoming X-ray beam from the X-ray diffraction apparatus and a reflection X-ray beam reflected off the sample.

In some embodiments, the flange members are positioned with respect to one another so as to define a second channel extending from a third portion of the outer edge to a fourth portion of the outer edge and through the sample space, such that the upper surface of the insert is flush with the top surface along the second channel.

In some embodiments, the second channel is configured to receive an anti-scatter baffle therealong.

In some embodiments, the anti-scatter baffle is positionable above the upper surface of the insert at a height lower than a depth of the second channel.

In some embodiments, there is provided an insert housing of a sample holder for an X-ray diffraction apparatus. The insert housing comprises: a sidewall defining an opening, the sidewall having a top surface having an outer edge and an inner edge, and a bottom surface opposite the top surface, the opening being adapted to removably receive an insert therein, the insert comprising an upper surface and a sample space for holding a sample; and a retention assembly for retaining the insert in the opening, the retention assembly comprising: flange members provided on the top surface and extending above the opening, the flange members being positioned so as to define a channel extending from a first portion of the outer edge of the top surface to a second opposed portion of the outer edge of the top surface and through the sample space; and a biasing assembly for biasing at least part of the upper surface of the insert against the flange members such that the upper surface of the insert is flush with the top surface at least along the channel.

In some embodiments, the insert housing has a substantially annular shape.

In some embodiments, the flange members and the upper surface are engageable along at least 50% of the perimeter of the upper surface of the insert.

In some embodiments, the flange members have a thickness of at least about 1 mm.

In some embodiments, the flange members are substantially flat.

In some embodiments, the flange members have a plate construction.

In some embodiments, the flange members have a substantially annular sector shape.

In some embodiments, the flange members have outer and inner curved edges and side edges, each side edge being substantially parallel with respect to a side edge of an adjacent flange member to define part of the channel.

In some embodiments, each of the flange members comprises an overhang portion configured for abutting against the upper surface of the insert.

In some embodiments, the insert housing is made of metal.

In some embodiments, the metal comprises at least one of steel, brass and aluminum.

In some embodiments, the flange members are positioned with respect to one another so as to define a second channel extending from a third portion of the outer edge to a fourth portion of the outer edge and through the sample space, such that the upper surface of the insert is flush with the top surface along the second channel.

In some embodiments, the second channel is configured to receive an anti-scatter baffle therealong.

In some embodiments, the anti-scatter baffle is positionable above the upper surface of the insert at a height lower than a depth of the second channel.

In some embodiments, an insert insertable in a sample holder of an X-ray diffraction apparatus is provided. The insert comprises: an upper surface made of amorphous PVC; and a sample space defined in the upper surface, for holding a sample.

In some embodiments, an insert insertable in a sample holder of an X-ray diffraction apparatus is provided. The insert comprises: an upper surface; a sample space defined in the upper surface, for holding a sample; and a standard reference space defined in the upper surface, for holding a standard reference substance.

In some embodiments, the standard reference space is a protuberance which is flush with the upper surface and in which the standard reference substance is embedded.

Other features will be better understood upon reading of embodiments thereof with reference to the appended drawings.

BRIEF DESCRIPTION OF THE DRAWINGS

FIG. 16b is a further exploded view of the sample holder of FIG. 16a.

FIG. 22 is a top plan view of a sample holder including multiple flange members, according to yet another embodiment.

FIG. 23 is a top plan view of a sample holder including two flange members, according to yet another embodiment.

DETAILED DESCRIPTION

Figure 1:
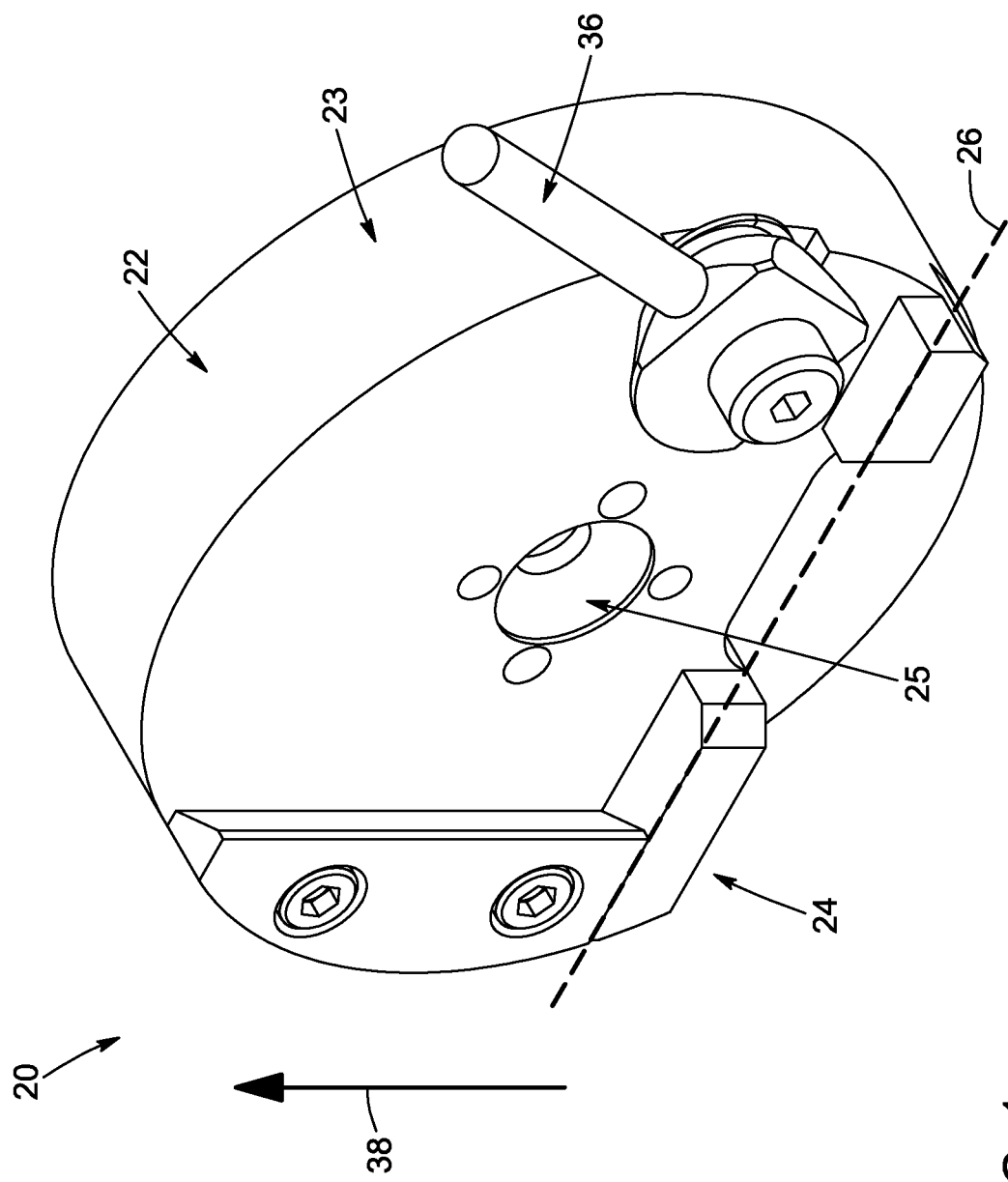
FIG. 1 is a top perspective view of a mounting system, according to an embodiment.

In the following description, similar features in the drawings have been given similar reference numerals. In order to not unduly encumber the figures, some elements may not be indicated on some figures if they were already mentioned in preceding figures. It should also be understood herein that the elements of the drawings are not necessarily drawn to scale and that the emphasis is instead being placed upon clearly illustrating the elements and structures of the present embodiments.

The present description generally relates to a mounting system for an X-ray diffraction apparatus, which will be referred to as a "universal mounting system", as it could be mounted on any kind (i.e. type and/or brand) of X-ray diffraction apparatus.

Moreover, it will be appreciated that positional descriptions such as "top", "bottom", "under", "left", "right", "front", "rear", "adjacent", "opposite", "parallel", "perpendicular", "inner", "outer", "internal", "external", and the like should, unless otherwise indicated, be taken in the context of the figures and should not be considered limiting.

In the present disclosure, the following terminology and expressions may also be used:

The terms "X-ray", "X-radiation", "light", "electromagnetic radiation", "optical", "spectral profile" "spectral waveband", derivatives and variants thereof, are used to refer to radiation in any appropriate region of the electromagnetic spectrum and, more particularly, are not limited to visible light. By way of example, the X-rays may cover or substantially correspond to wavelengths ranging from 0.01 to 10 nanometers (i.e. frequencies in the range of 30 petahertz to 30 exahertz), which may be of particular interest for applications in the materials science industry for investigating the structural (e.g. atomic structure) or mechanical (e.g. residual stress) properties of samples.

The terms "sample", "sample under investigation", "material", "analyzed sample", "powder", "thin films", derivatives and variants thereof are used to refer to a quantity of matter extracted or taken apart from a larger amount for analysis, or may refer to matter that is either natural (e.g. a specific chemical element found in nature), synthesized (e.g. a reaction of chemical compounds), or man-made (e.g. a power formed by scratching a thin film). It will be understood that the sample intrinsically has various physical and chemical properties, which may be assessed using different instruments and methods (e.g. XRD analysis).

The terms "diffractometer", "X-ray diffraction apparatus", "XRD diffraction system", "powder diffraction instruments", "X-ray apparatus", derivatives and variants thereof refer to an apparatus configured to acquire patterns obtained by recording the intensities of X-rays scattered by the sample under investigation at different angles between an incident beam (i.e. beam incident on the sample) and a scattered beam (also referred to as "reflected beam"). The acquired patterns are typically representative of given properties (e.g. structure) of the material to be inspected. The above-mentioned apparatus could further be understood as a device configured to sense and/or probe x-rays scattered and/or reflected by the surface to be inspected, according to the needs of a particular application. It will be understood that different attachments (also referred to as "external device", e.g. different kinds of sample holders or the like) may be attached to the XRD apparatus.

Mounting System and Method

The mounting system and related elements and/or components that will be described herein are particularly useful in the field of materials analysis. Although such system and related elements and/or components may be particularly useful for allowing high-precision positioning of attachment for X-ray apparatus, they may also be aimed at other applications, such as different kinds of microscope or other optical assembly or system in which positioning of a sample at a precise, reliable and repeatable location may be needed.

As previously mentioned, some embodiments may be useful in the field of X-ray powder diffraction when, for example, the atomic and/or molecular structure of a crystal has to be identified, or when residual stress of materials has to be assessed. Embodiments of the mounting system and associated XRD apparatus are described below as they have been designed for use in the field of material inspection, but they may of course be used in the broad field of non-destructive inspection, testing or evaluation, in which XRD analysis only serves the purpose of a useful example.

As one skilled in the art would readily understand, some of the X-ray diffraction apparatuses typically (but not necessarily) include a goniometer allowing an object (e.g. a detector and/or a source) to be rotated to a precise angular position with respect to a center of rotation. A rotation axis may pass through the center of rotation, and, as such, defines an axis about which an X-ray source and/or a detector may rotate. The rotation axis may then be referred to as "the rotation axis of the goniometer" or, alternatively, "the rotation axis of the XRD apparatus". In the following, the rotation axis will be understood as being an axis comprised in a plane extending substantially parallel to an "XY plane" and crossing the center of rotation. In the current description, the "XY plane" is defined as a plane substantially parallel to (or a plane coinciding with) a surface of the sample to be characterized. Conversely, the surface of the sample lies in a plane substantially parallel to the XY plane or in a plane coinciding with the XY plane. In such scenario, a "Z direction" or, alternatively, a "Z axis", and variants thereof (e.g. "Z plane") will hence be understood as the axis being substantially perpendicular to the XY plane (i.e. the surface of the sample). Broadly, the present description will refer to the "X, Y, Z planes" as being three perpendicularly intersecting planes, but as it will be readily understood, the angle between the planes may vary (e.g. the angle formed at the intersection of the X and Y planes may be different than 90 degrees, or the angle formed at the intersection of the Z plane with the XY plane may be different than 90 degrees). For the sake of clarity and concision of the present description, the XY plane will herein be referred to as lying in a horizontal plane (i.e. a horizontal direction), while the Z axis will be referred to as lying in a vertical plane (i.e. a vertical direction).

The XRD apparatus may include, in addition to the goniometer, an X-ray source (including, for example, a vacuum-sealed X-ray tube), an X-ray generator delivering high tension current to the X-ray source, a sample holder to hold the sample to be investigated, an X-ray detector capable of detecting X-ray and/or X-ray photons scattered by the sample and an X-ray optical assembly (typically used for collimating, conditioning, or focusing the X-rays at the detector).

As it has been previously mentioned, the XRD pattern is obtained by recording the intensities of X-rays scattered by the sample at different angles between the beam incident on the sample and beam scattered by the sample. When it is required to use different attachments (herein referred to as "external devices") for assessing the properties of the sample, it is hence crucial, for obtaining significant and reliable results, that the sample is maintained at the same position with respect to the X-ray source and X-ray detector from one attachment to another.

Figure 2:
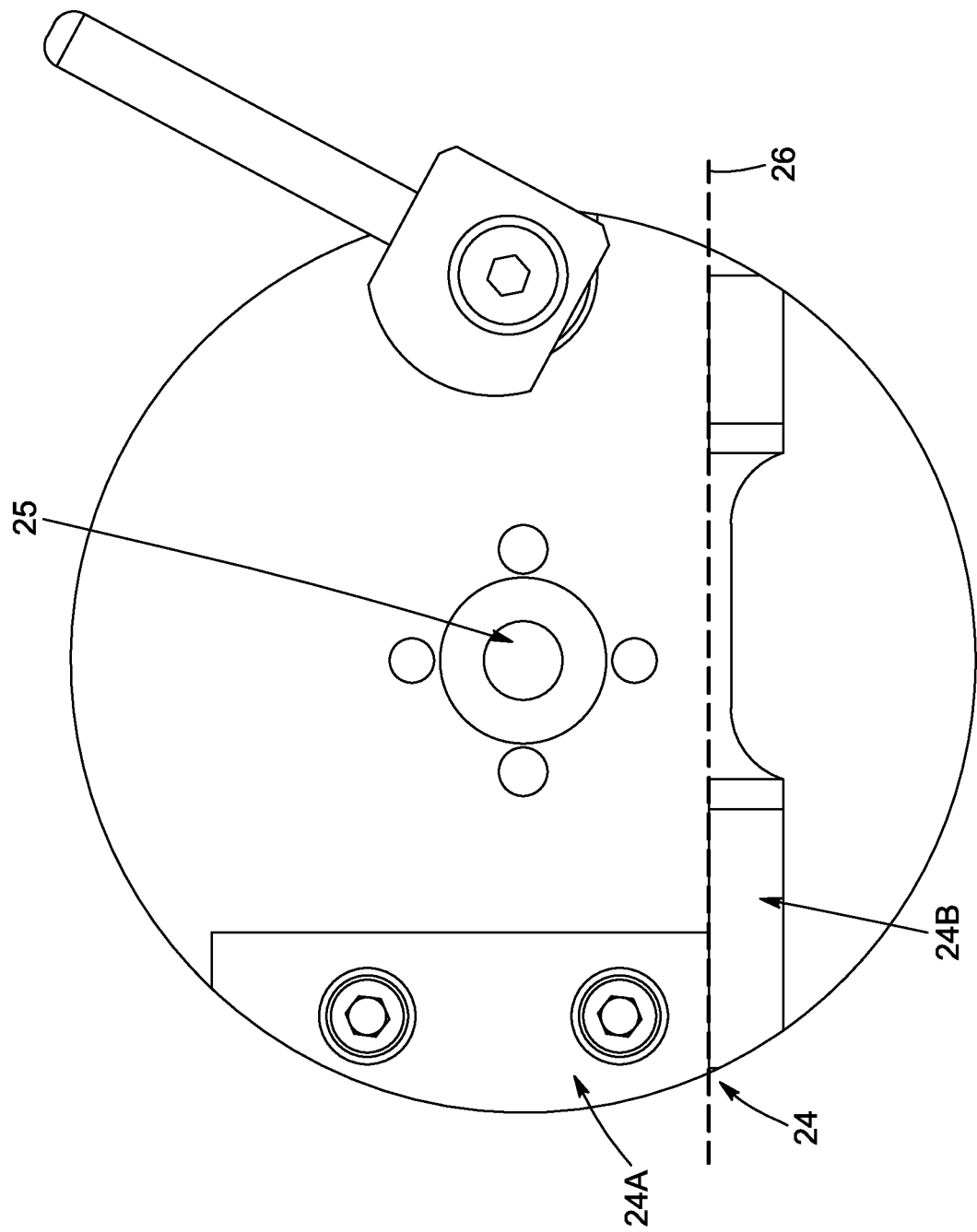
FIG. 2 is a front view of the mounting system of FIG. 1.
Figure 3:
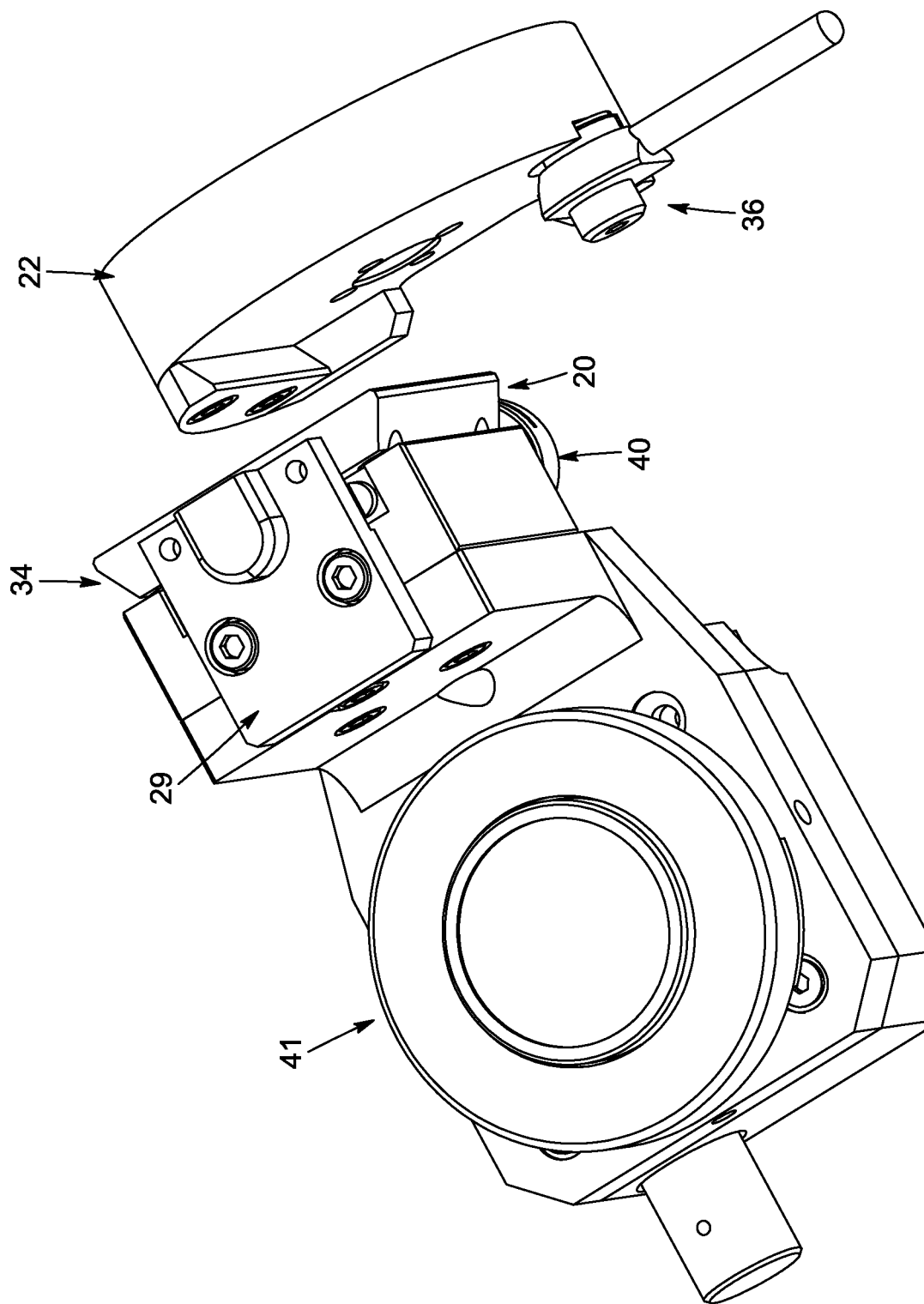
FIG. 3 is a top perspective view of an attachment module held in proximity to a mounting system, according to an embodiment.
Figure 4:
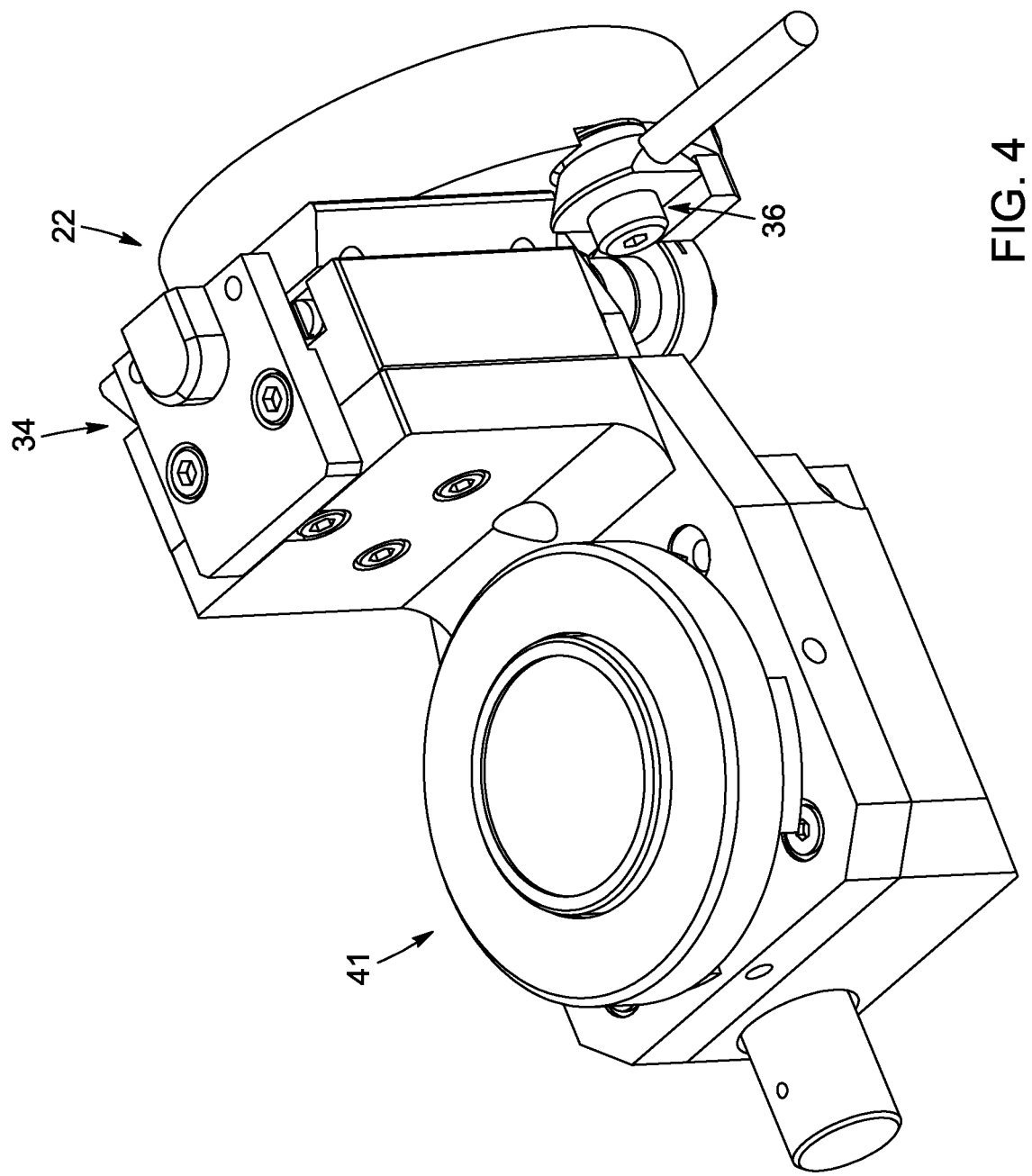
FIG. 4 is a top perspective view of the attachment module of FIG. 3 about to be engaged with the mounting system of FIG. 3.
Figure 5:
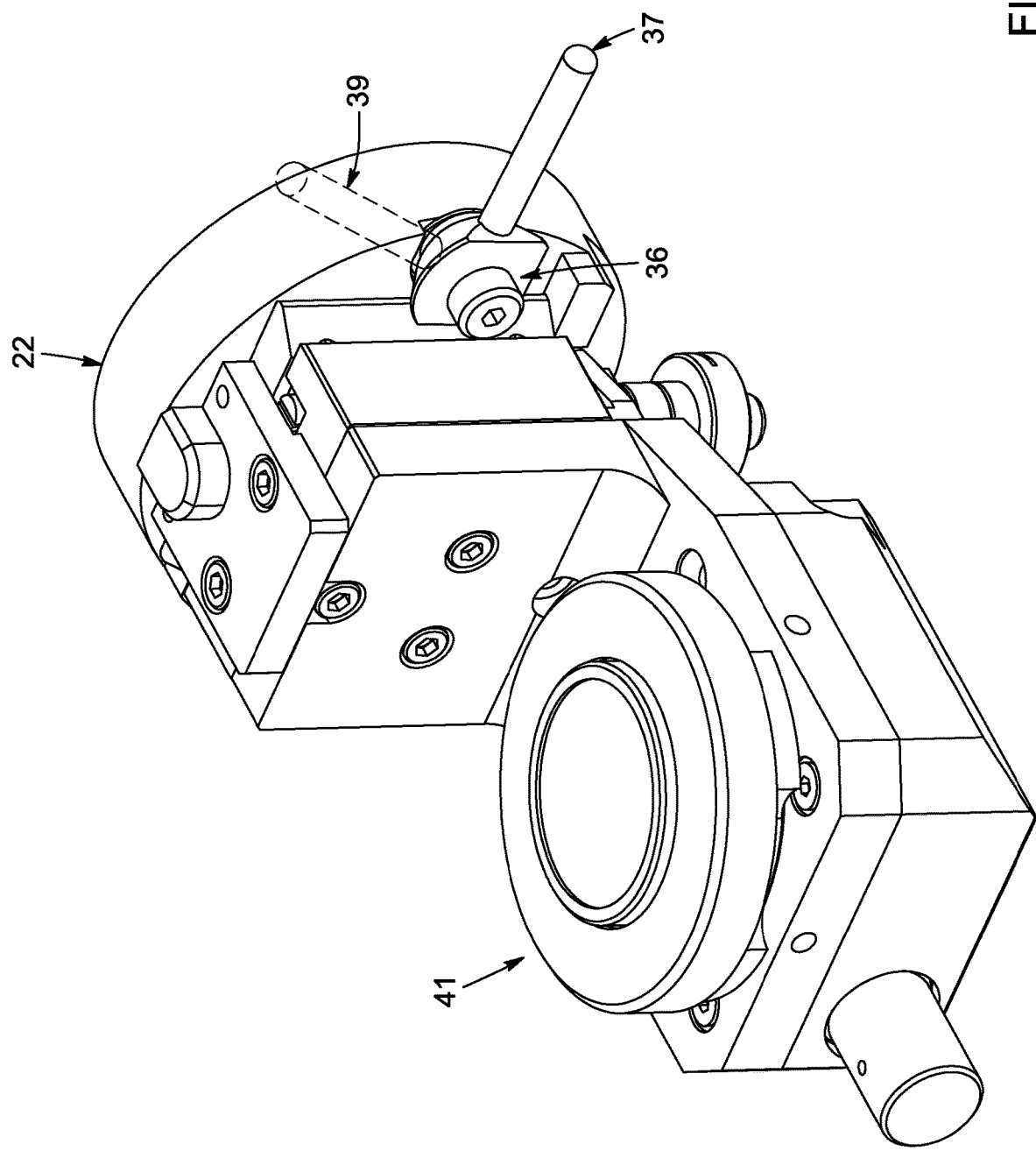
FIG. 5 is a top perspective view of the attachment module of FIG. 3 engaged with the mounting system of FIG. 3.
Figure 6:
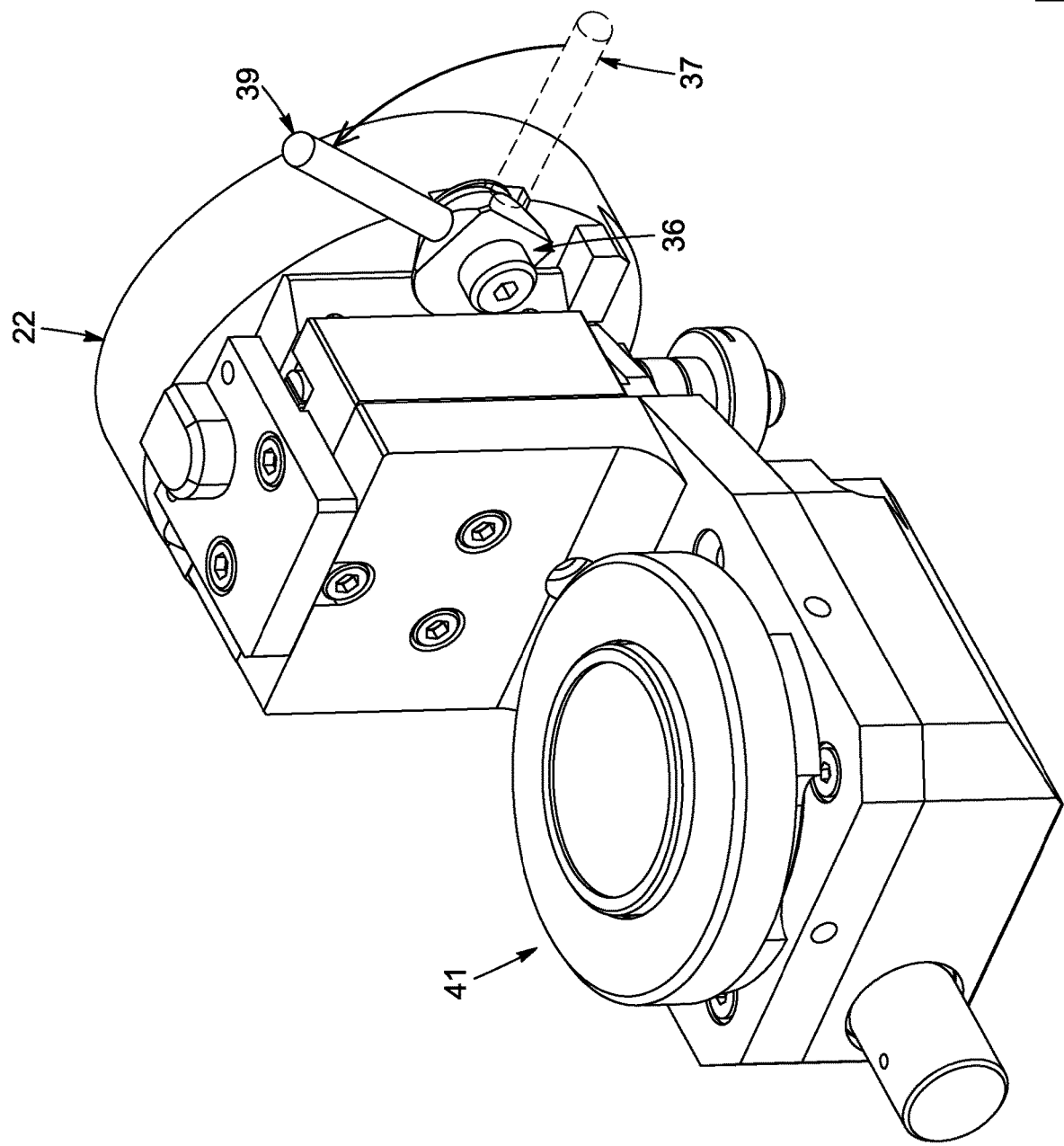
FIG. 6 is a top perspective view of an attachment module interlocked with a mounting system, according to an embodiment.
Figure 7:
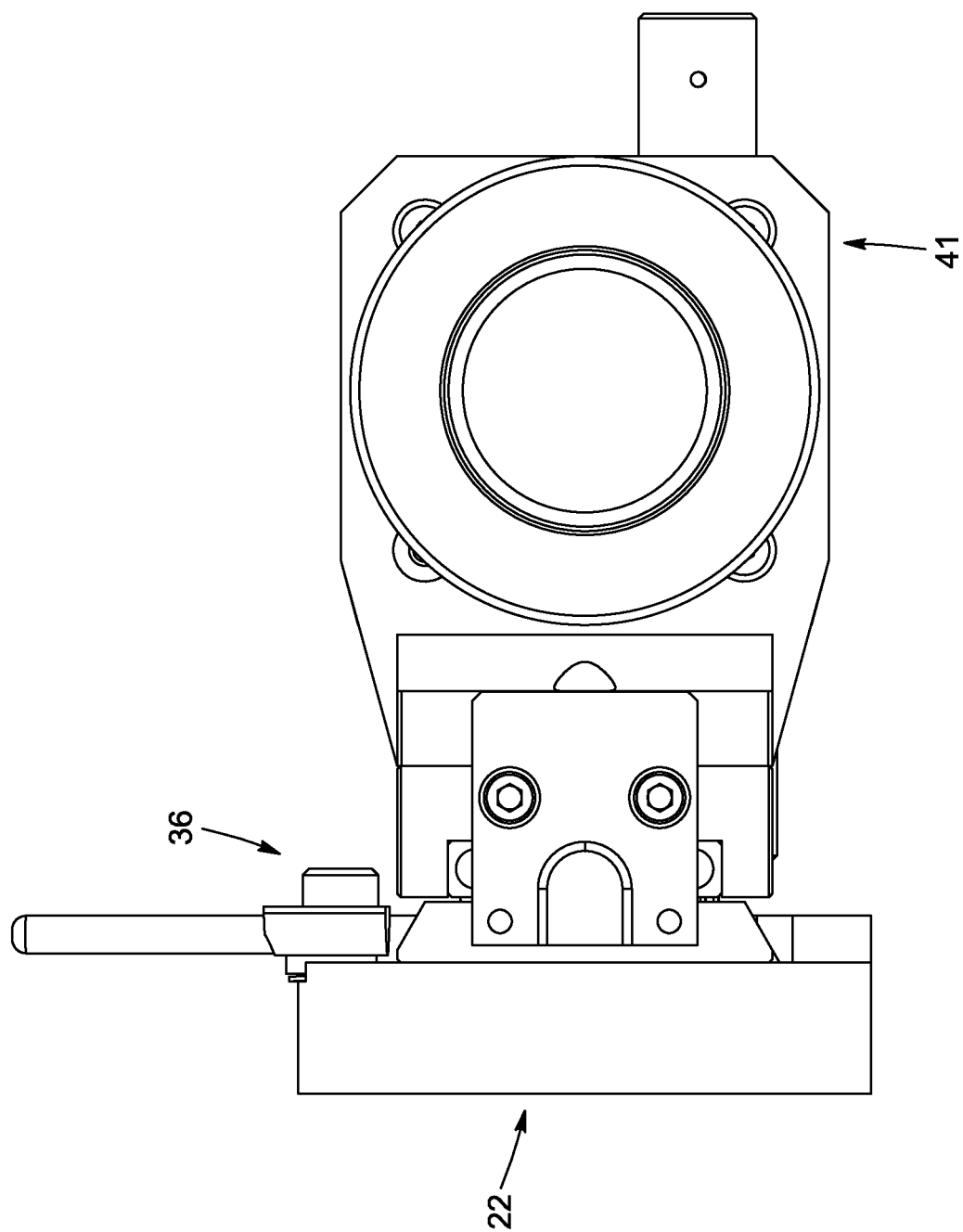
FIG. 7 is a top view the attachment module interlocked with the mounting system of FIG. 6.

Referring to FIGS. 1 and 2, a mounting system 20 for an X-ray diffraction apparatus is shown. In some implementations, the XRD apparatus may include a shaft mounted onto the X-ray diffraction apparatus near or at the center of rotation of the goniometer.

The mounting system 20 includes a mounting bracket 22. The mounting bracket 22 is rotatably mountable onto the X-ray diffraction apparatus, for example near the center of rotation of the goniometer. In some implementations, the mounting bracket 22 is rotatably mounted onto the shaft of the XRD apparatus, and is aligned with both the shaft of the X-ray diffraction apparatus and the center of rotation of the goniometer), as it will be described with greater details below. It will be understood that the term "aligned" generally refers to an arrangement in appropriate relative positions between the mounting bracket 22 and the XRD apparatus (or any other elements or group(s) of elements). For example, a central portion of the mounting bracket 22 may be aligned with a portion the XRD apparatus, or the rotation axis of the goniometer (i.e. the rotation axis may pass through the central portion of the mounting bracket 22).

As illustrated, the mounting bracket 22 has a substantially circular outer edge 23 and has a central hole 25. The mounting bracket 22 may be made from any solid material such as stainless steel, brass, aluminum, copper. Of course, the mounting bracket 22 could have various geometrical configurations (i.e. size and dimensions), and could, for example, have a triangular, rectangular, circular, or any other shaped body and/or outer edge 23, as dictated by one's needs. The size of the mounting bracket 22 is typically influenced by the dimensions of the external device to be mounted onto the mounted bracket.

The central hole 25 may have a circular shape so as to allow an affixing means to be inserted therein. The affixing means could be, but are not limited to bolts, screws, or any other elements allowing the mounting bracket 22 to be affixed to the X-ray diffraction apparatus, when the central hole 23 or a portion of the central hole is aligned with the rotations axis of the XRD apparatus. Different geometrical configurations are also possible. For example, the mounting bracket could include a plurality of holes for allowing a plurality of affixing means to be inserted therein, so as to be affixed the mounting bracket 22 to the XRD apparatus, as already known by one skilled in the art.

Different components and/or means may be used to mount the mounting bracket 22 onto the XRD apparatus. For example, a snap-lock mechanism may be provided onto the XRD apparatus and the mounting bracket, so as the mounting bracket is properly aligned with respect with the rotation axis of the goniometer. Alternatively, various affixing means, including, but not limited to glue, screws, clips, welding, magnets, variants and combinations thereof could be used. As it will be readily understood, the mounting bracket 22 substantially remains at the same position (i.e. horizontal and vertical positions) as the one it has been mounted (i.e. the alignment has to be maintained) while being freely rotatable about the rotation axis of the XRD apparatus, and various mechanical means and components to achieve this objective could be used. In some implementations, the mounting bracket 22 may be rotatable about the shaft of the XRD apparatus.

Still referring to FIGS. 1 and 2, the mounting bracket 22 also includes an abutment structure 24 defining a reference position 26. The reference position 26 is in spatial relationship with the central hole 25, and so is also in spatial relationship with the rotation axis of the goniometer. The reference position 26 defines a position, or more particularly, a relative height (herein defined as being normal to the XY plane, or the surface of the sample) to which may be mounted the external device(s), as it will be described with greater details later. In the illustrated variant, the reference position 26 is located below the central hole 25. In the following, the reference position 26 is defined by a transverse axis of the mounting bracket 22. The transverse axis lies in the XY plane.

As illustrated in FIGS. 1 and 2, the abutment structure 24 includes a first abutment element 24A having a vertically-extending portion and a second abutment element 24B having a horizontally-extending portion, meaning that the first and second abutment elements 24A,24B are substantially perpendicular (the first lies in the Z plane, while the second lies in the XY plane). Alternatively, the first and second abutment elements 24A,24B could be disposed at an angle different than 90 degrees with respect to each other, or may even be parallel to each other. In the later configuration (i.e. the two elements 24A, 24B being parallel), the first abutment element 24A may be provided near a top portion of the mounting bracket 22, while the second abutment element 24B may be provided near a bottom portion of the mounting bracket 22 (or vice-versa). Alternatively, the first abutment element 24A may be provided near a left portion of the mounting bracket 22, while the second abutment element 24B may be provided near a right portion of the mounting bracket 22 (or vice-versa). In such configurations, the two elements 24A,24B are spaced apart from the central hole 25.

The first and second abutment elements 24A, 24B are mounted and mechanically affixed to the mounting bracket 22, but may optionally be formed directly in/from the mounting bracket 22. In this configuration, the mounting bracket 22 forms an integrated piece (i.e. a monolithic element) having two protuberances extending outwardly from a surface of the mounting bracket 22. Alternatively, at least one of the first and second abutment elements 24A, 24B could be a notch, a recess or a combination thereof. It will be understood that he first and second abutment elements 24A,24B encompass a large variety of components and means allowing an external device to be mounted to the mounting bracket 22.

In some embodiments, the first and/or second abutment elements 24A,24B may have an inner portion. Optionally, the inner portion may be profiled and/or machined. For example, the inner portion of the first and/or second abutment elements 24A,24B could have a notch or a groove (also referred to as a "slide") defining a dovetail profile, so as to be engageable with a compatible piece having a corresponding dovetail profile (i.e. the dovetail profile of the first and/or second abutment elements 24A,24B is the "negative image" of the dovetail profile of the compatible piece). The inner portion may further be machined or micromachined to provide a texture, a slope, a geometrical configuration or any other properties to the inner portion, according to one's needs.

At least one of the first and second abutment elements 24A, 24B could be replaced by various components or structures. For example, they could be replaced by holes to allow appropriate positioning of the external device onto the mounting bracket 22. By way of an example, the first and second abutment elements 24A, 24B may comprise a snap-lock mechanism cooperating with the external device.

As it has been previously mentioned, the external device may be a sample holder, a non-ambient stage, or any other elements need for a targeted application.

Now referring to FIGS. 3 to 9, the mounting system 20 also includes an attachment module 28 mountable onto the mounting bracket 22 at an adjustable attaching position 30 with respect to the reference position 26, the attaching position 30 extending in a Z direction 38. As illustrated, the Z direction 38 is substantially perpendicular to the XY plane (i.e. the surface of the sample). As it has been already mentioned, the Z direction 38 will be understood as a "vertical direction", and the expression "attaching position 30 of the attachment module 28 in" has to be understood as the adjustable attaching position 30 of the attachment module 28. More particularly, the attaching position 30 may be adjusted so as the attachment module 28 is "aligned", i.e. at a proper height with respect with the reference position 26, and/or with respect with the X-ray source and detector. In some implementations, the attaching position 30 is adjustable along one direction normal to the reference position 26, and so the attaching position 30 may be aligned with the rotation axis along the direction normal to the reference position 26.

The attachment module 28 is typically provided on the external device 41 and includes at least one attaching element 34 (also referred to as "the attaching element 34"). The attaching element 34 is engageable with the abutment structure 24 for abutting the mounting bracket proximate the reference position 26, and hence allow to position the external device 41 with respect to the reference position 26.

In the illustrated variant, the attaching element 34 is mechanically connected to the external device 41 via a support plate 29 affixed to the attaching element 34 at one end and to the external device 41 at another end. Consequently, when the attaching position 30 is adjusted, the attaching element 34 and/or the external device 41 may be translated (i.e. may be adjusted) along the Z direction 38.

The attaching element 34 may be provided with a notch or a groove (also referred to as a "slide") to enable a repeatable placement of the external device. Similarly to the first and second abutment elements 24A, 24B, the attaching element 34 is mechanically designed to allow repeated positioning with high precision (order of magnitude of the precision in the microns).

More particularly, the attaching element 34 is designed, sized and has the geometrical configuration so as to be mountable onto any kinds of external device (e.g. sample holder or non-ambient stage) and compatible with the mounting bracket 22 (i.e. with the abutment structure 24). Consequently, the design and the geometrical features of the attaching element 34 are similar to the ones of the abutment structure 24, or more precisely, the first and second abutment elements 24A,24B (i.e. they may abut and may be considered as compatible and/or engageable). Optionally, the attaching element 34 may be matably engageable with a corresponding at least one of the first and second abutment elements 24A, 24B.

When the attaching element 34 is mounted to the mounting bracket 22 via the abutment structure 24, the attaching element 34 is blocked in the XY directions, and only an adjustment in the Z direction 38 may be required. This feature can be advantageous, for example, when one has to use different external devices, as it may substantially diminish the amount of time required to perform the adjustment. Indeed, the external device 41 has to be adjusted according to only one axis (herein referred to as a Z axis extending in the Z direction), instead of three axes (X, Y and Z). It is to be mentioned that one may need to pre-align the attachment module 28, the attaching element 34 and/or the external device 41 the first time the mounting system 20 is used. The pre-alignment may include an adjustment along one, two or three directions (defined by the X, Y, and/or Z axis).

The mounting system 20 further includes an adjustment mount 40 for adjusting the attaching position 30 of the attachment module 28 along the Z direction 38. The adjustment mount 40 may be mounted directly on the attaching element 34 or may be mounted onto the external device 41, as long as the adjustment mount 40 allows translating the attachment module 28 onto which is mounted the external device 41. Optionally, the attaching element 34 and/or the external device 41 may translate along the Z direction 38. For example, the external device 41 may be affixed to the attaching element 34, and the attaching element 34 may be translatable along the Z direction 38 (i.e. the attaching element 34 may slide in the mounting bracket 22, thereby translating the external device 41, or vice versa).

In some embodiments, the adjustment mount 40 has a bottom portion 42 and comprises a screw 44 mechanically connected with the bottom portion. The screw 44 may be a micrometer screw or a differential screw. Alternatively, the screw 44 may be replaced by any other component(s) or mechanism allowing to make small and precise adjustment to the attaching position 30.

The mounting system 20 also includes a biasing assembly 36 mounted onto one of the mounting bracket 22 or to the attachment module 28 for interlocking the mounting bracket 22 with the attachment module 28, such that the mounting bracket 22 is blocked along the XY plane (i.e. the mounting bracket may not move in the XY plane or the horizontal direction). For example, the biasing assembly 36 could be mounted on either the sides or the top portions of one of the mounting bracket 22 or the attachment module 28. As it has been previously mentioned, the external device 41 hence only needs to be adjusted along one vertical direction (e.g. the Z direction 38).

The mechanism 36 may include levers with screw and/or threaded hole(s), locking knob, spring plungers, combinations thereof, or any other mechanical component allowing to interlock the mounting bracket 22 with the attaching element 34.

As illustrated, the biasing assembly 36 is a lever rotatably mounted onto the mounting bracket 22 and is free to rotate about its head. The lever may be rotated from an unlock angular position 37 to a lock angular position 39. When the lever is in the unlock angular position 37, the attaching element 34 may be put in contact (i.e. engaged) with the abutment structure 24 (through the first and second abutment elements 24A, 24B). Conversely, the attaching element 34 may also be disengaged from the abutment structure 24. In use, the attaching element 34 abuts the abutment structure 24, and the lever in is the lock angular position: 39 the attaching element 34 is thus blocked in the XY plane.

Figure 8:
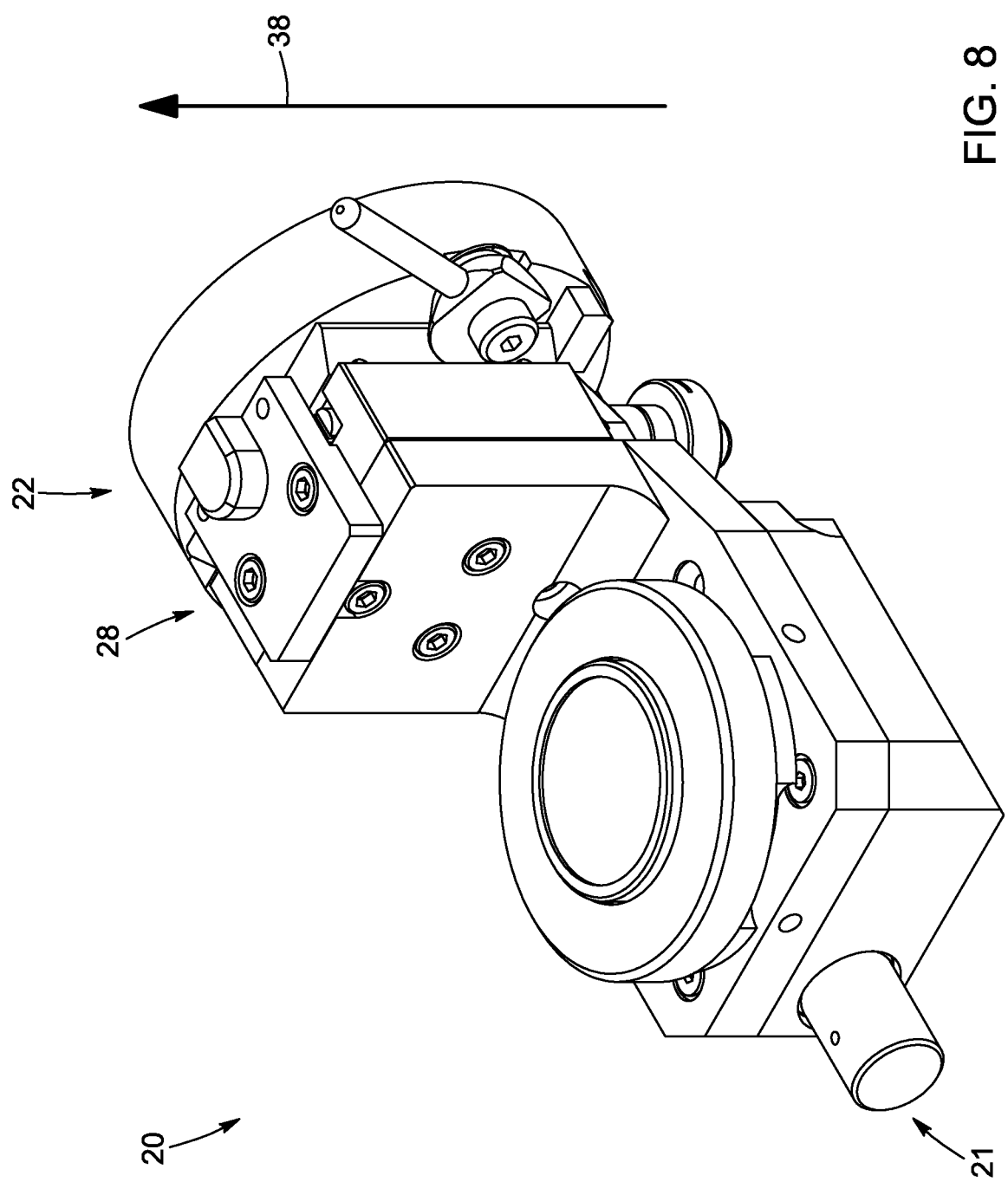
FIG. 8 is a top perspective view of a mounting system interlocked with an attachment module mounted onto a sample holder, according to an embodiment.
Figure 9:
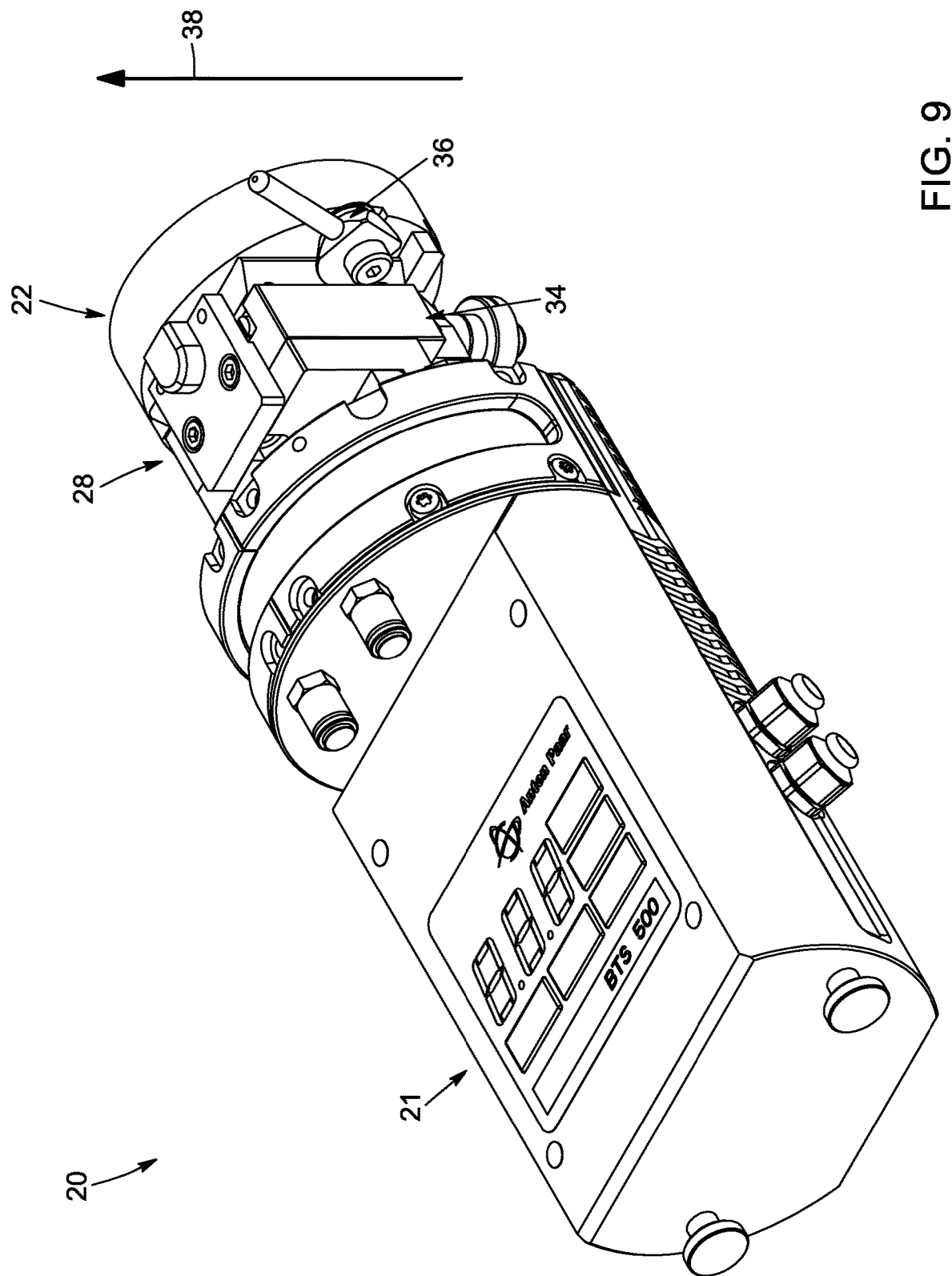
FIG. 9 is a top perspective view of a mounting system interlocked with an attachment module mounted onto a non-ambient stage, according to an embodiment.

Some embodiments of a mounting assembly are illustrated in FIGS. 8 and 9. The mounting assembly is typically similar to the mounting system, but further comprises an external device 41 mechanically connected to the attaching element 34. The external device 41 may be, for example, a sample holder (FIG. 8) or a non-ambient stage (FIG. 9). In both examples, the external device 41 is interlocked with the mounting bracket 22. The attaching position 30 of the attachment module 28 may only be adjusted along the Z direction 38 (i.e. the attachment module 28 may not move in the X and Y directions).

In some scenarios, the mounting system 20 and assembly disclosed in the present description can provide an easy-to-install and easy-to-align mounting bracket 22, as compared to existing mounting systems and bracket.

In some embodiments, the mounting bracket 22 is equipped with a miniature slide (i.e. a "groove" or a "notch") that may have, for example, a dovetail profile. The mounting bracket 22 can be engageable with an attachment module 28 including at least one attaching element 34, so as to enable a repeatable placement of external devices. The mounting bracket 22 also allows positioning the external devices with high precision (order of magnitude of the precision in the microns). Furthermore, the mounting system 20 can be configured to be "universal", meaning that it could be mounted onto an existing XRD apparatus (i.e. XRD apparatus known in the art).

In some scenarios, the angle between the sample and the incident beam is modified during the measurements. This can typically be achieved in several ways, for example: (i) fixed source, rotating sample, moving detector ($\theta/2\theta$ mode); (ii) fixed sample, moving source, moving detector ($\theta/\theta$ mode); or (iii) fixed detector, moving source, rotating sample ($2\theta/\theta$ mode). It is to be noted that the mounting system described above is compatible with the different aforementioned detection modes (i.e. $\theta/2\theta$, $\theta/\theta$ and/or $2\theta/\theta$).

It is also to be noted that the mounting system described above may be configured to be mountable onto either bench scale XRD apparatus or full laboratory XRD system. It is understood that the different characteristics of the XRD apparatus such as the size, the power, the resolution and/or the like should not limit the use of the mounting system presented in the current description.

In accordance with embodiments, there is also provided a method for mounting a mounting system onto an X-ray diffraction apparatus having a rotation axis. The method includes steps of: defining a mounting position, providing a mounting bracket proximate the mounting position, rotatably mounting the mounting bracket to the X-ray diffraction apparatus, and affixing the mounting bracket to the X-ray diffraction apparatus.

In some embodiments, the method includes a step of defining a reference position.

In some embodiments, the method includes a step of determining a position of a rotation axis of a goniometer.

In some embodiments, the step of aligning the portion of the mounting bracket with the center of rotation includes defining a reference position in spatial relationship with the center of rotation.

In some embodiments, the step of affixing the mounting bracket to the X-ray diffraction apparatus comprises mechanically rigidly connecting the mounting bracket with the X-ray diffraction apparatus.

In some embodiments, the method for mounting a mounting system onto an X-ray diffraction may further comprise steps of: providing an attachment module engageable with the mounting bracket, engaging the attachment module with the mounting bracket, interlocking the attachment module and the mounting bracket, and adjusting an attaching position of the attachment module with respect with the reference position.

For example, the method may include steps of mechanically connecting the attachment module with an external device and adjusting a horizontal position of the external device. As it has been previously stated, the horizontal position is in spatial relationship with the center of rotation.

In accordance with embodiments, there is also provided a method for aligning an attachment module with a mounting bracket having an abutment structure and being mounted onto an X-ray diffraction apparatus.

The method may include step of mounting a first attachment module having an attaching element onto the mounting bracket, abutting the attaching element to the abutment structure proximate a reference position, interlocking the first attachment module to the mounting bracket, and adjusting an attaching position of the first attachment module with respect with the reference position.

In some embodiments, the interlocking step comprises engaging a biasing mechanism with the attaching element or the mounting bracket.

In some embodiments, the method may include at least some of the following steps: unlocking the first attachment module from the mounting bracket, detaching the first attachment module from the mounting bracket, replacing the first attachment module onto the mounting bracket, interlocking the first attachment module to the mounting bracket, verifying the attaching position of the first attachment module and detaching the first attachment module from the mounting bracket.

In some embodiments, the method may include at least some of the following steps, mounting a second attachment module onto the mounting bracket, abutting the second attachment module to the abutment structure proximate the reference position, interlocking the second attachment module to the mounting bracket, and adjusting an attaching position of the first attachment module with respect with the reference position.

In some embodiments, the step of interlocking the second attachment module to the mounting bracket comprises engaging a biasing mechanism with the at least one attaching element or the mounting bracket In some embodiments, the method may further comprise at least some of the following steps: unlocking the second attachment module from the mounting bracket, detaching the second attachment module from the mounting bracket, replacing the second attachment module onto the mounting bracket, interlocking the second attachment module to the mounting bracket, and verifying the attaching position of the second attachment module.

In some embodiments, the interlocking step includes engaging a biasing mechanism with the at least one attaching element or the mounting bracket.

The method may comprise additional steps aimed at verifying the alignment between the first attachment module and the center of rotation (i.e. confirming that the alignment is appropriate, and maintained from one measurement to another). Such additional steps may include, for example a step of unlocking the first attachment module from the mounting bracket, a step of detaching the first attachment module from the mounting bracket, a step of replacing the first attachment module onto the mounting bracket, a step of interlocking the first attachment module to the mounting bracket and a step of verifying the alignment between the first attachment module and the center of rotation of the goniometer.

When a user needs to change from one external device (connected to a first attachment module) to another (connected to a second attachment module), the method may include a step of detaching the first attachment module from the mounting bracket, a step of mounting a second attachment module having at least one attaching element onto the mounting bracket, a step of interlocking the second attachment to the mounting bracket and a step of adjusting the horizontal position of the second attachment module.

Figure 10:
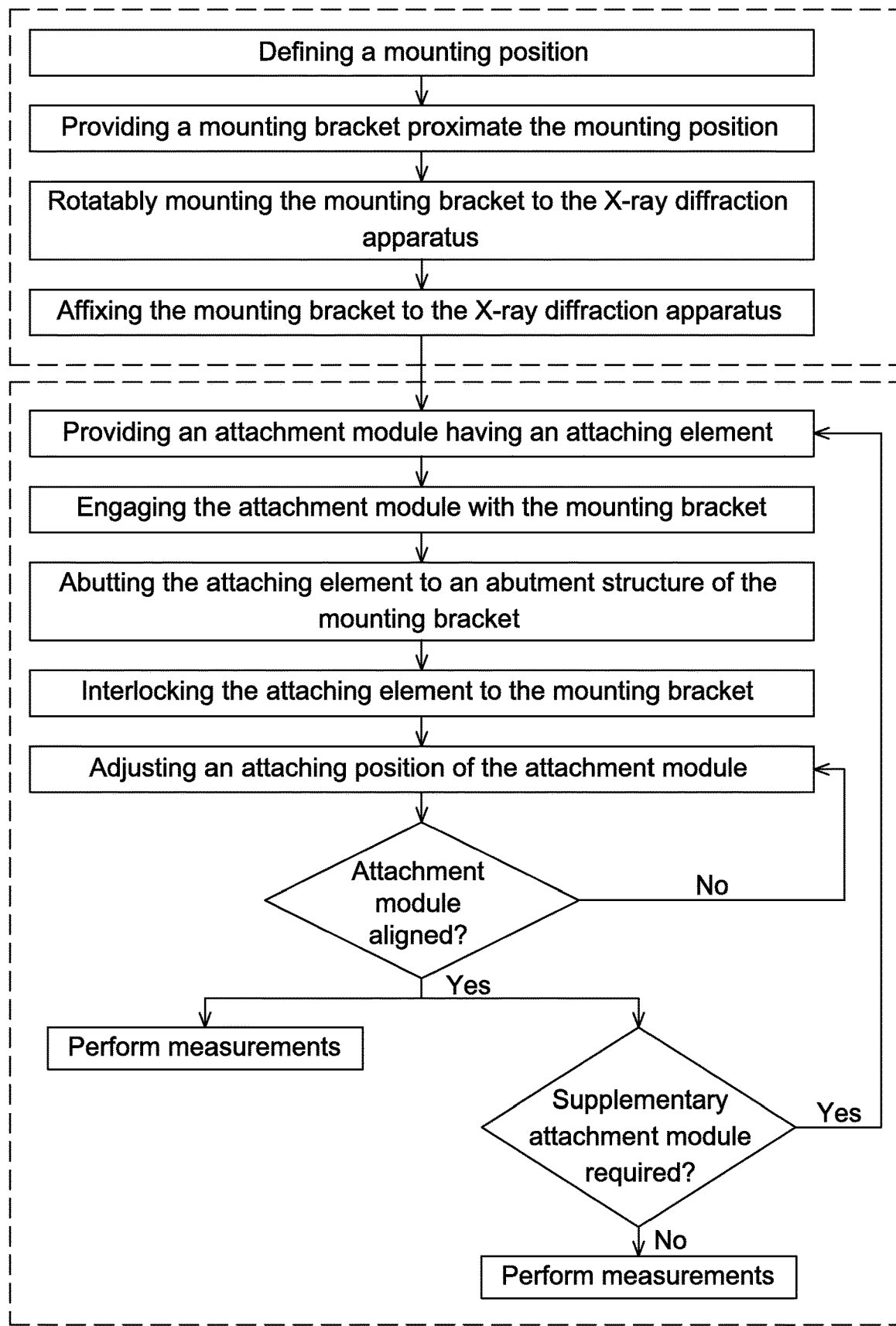
FIG. 10 is a workflow chart illustrating an example of a method for mounting a mounting system to an X-ray diffraction apparatus and for aligning an attachment module with a mounting bracket mounted onto the X-ray diffraction apparatus, according to an embodiment.

FIG. 10 illustrates an example of a workflow chart representing a method that may be used for mounting the mounting system to the XRD apparatus and/or aligning an attachment module with a mounting bracket having an abutment structure and being mounted onto an X-ray diffraction apparatus. This example combines some of the embodiments which has been previously introduced, but may also comprise additional steps to ensure a proper alignment of the mounting bracket, the attachment module, the attaching element and/or the external device, as it will be readily understood by one skilled in the art.

In some embodiments, a method for pre-aligning each external device may comprise the steps of placing and replacing the external device.

The step of placing the external device may comprise sub-steps of: mounting the external device, locking the external device in place with a lever, aligning the external device to the center of rotation using the attaching element, unlocking the lever, and removing the external device.

The step of replacing the external device may include sub-steps of: replacing the external device and checking the alignment again. These steps may be followed by sub-steps of: removing the external device, mounting a second external device 41', locking the second external device in place, aligning the second external device 41 to the center of rotation using the attaching element, unlocking the lever, removing the second external device, replacing the second external device, and checking the alignment again.

For a subsequent use, the user may just mount any external device, lock it in place and verify the alignment along the Z axis.

The method as presented in the current description can allow for a high-precision positioning of external devices. Furthermore, in some scenarios, the time associated with the alignment can be reduced or even significantly reduced, as the alignment is performed in only one direction (the Z axis). The user only has to replace (i.e. change) the external device and may quickly perform measurements, after a brief verification of the alignment.

It is appreciated that features of one of the above described embodiments can be combined with the other embodiments, variants or alternatives thereof.

Moreover, although the embodiments of the mounting bracket, abutment structure, attachment module, attaching element, biasing assembly and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations (dimensions, shape, and the like), may be used for the mounting bracket, abutment structure, attachment module, attaching element and biasing Full Sample Holder The following section provides embodiments of a sample holder for an X-ray diffraction apparatus, which may be used for conducting measurements at very low reflection angles (e.g., $0°<6<3°$), while maintaining a low background noise. The sample holder includes an insert for holding the sample, and an insert housing into which the insert is receivable.

Referring to FIGS. 11 to 16, a sample holder 100 for an X-ray diffractometer is shown. The sample holder 100 includes an insert housing 104 and an insert 102 receivable in the insert housing 104. The insert housing 104 includes a first surface (or top surface) 108 and a second surface (or bottom surface) 110 opposite to the first surface 108. The first surface 108 and the second surface 110 are connected by a sidewall 112, thereby defining an opening 114 between the first surface 108 (at a first end of the sidewall 112) and the second surface 110 (at a second end of the sidewall 112). In some embodiments, the insert housing can be made of metal, which can be at least one of steel and aluminum. In some embodiments, the insert 102 can be made of a polymer material, as will be described in further detail below.

Figure 19:
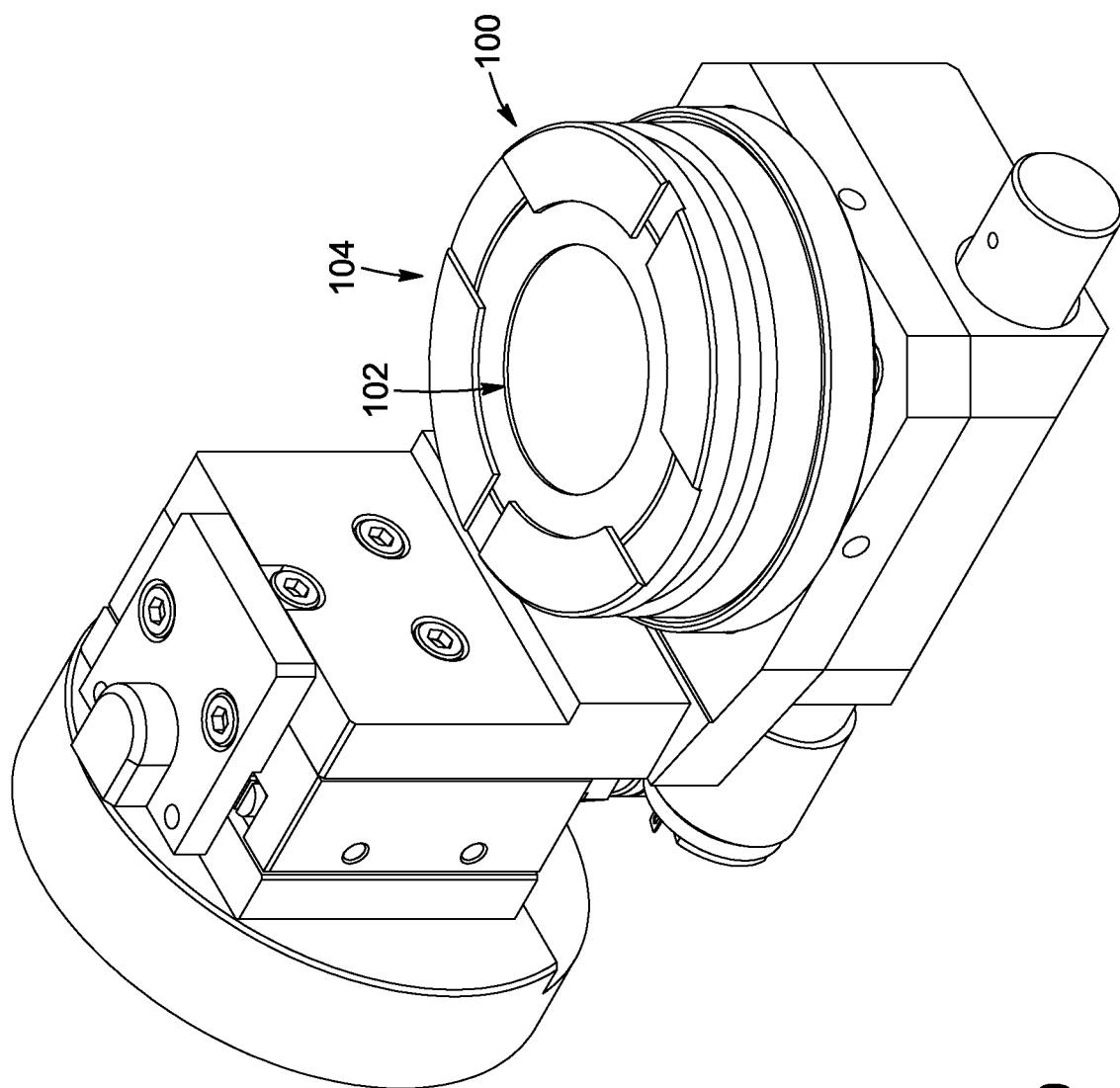
FIG. 19 is a top perspective view of the sample holder of FIG. 11, mounted on an X-ray diffractometer (X-ray diffractometer partially show).

In the embodiment shown on FIGS. 11 to 16, the first surface 108 is an annulus having a circular outer edge 108a and a circular inner edge 108b. The second surface 110 has a generally annular shape provided with recesses 120, and the opening 114 is a through-hole defined between the first surface 108 and the second surface 110, such that the insert housing 104 is ring-shaped. It is understood that in other embodiments, the size and shape of the first surface 108, the second surface 110 and the sidewall 112 can vary, depending on the X-ray diffractometer used. For example, the insert housing 104 can have a rectangular shape or any other suitable shape. It is also understood that the opening 114 is not necessarily a through-hole. For example, the opening 114 can be open at the first end of the sidewall 112, and closed at the second end of the sidewall 112. In some embodiments, the second surface 110 can be directly used as a supporting surface for setting the sample holder 100 onto a measurement platform of the X-ray diffractometer, as shown on FIG. 19.

In some embodiments, the opening 114 is adapted to receive the insert 102. It is understood that by "adapted to receive the insert", it is meant that the opening 114 is sized such that the insert 102 can fit therein. In the embodiment shown on FIGS. 11 to 16, the insert 102 is insertable into the insert housing 104 from the second end of the opening 114. However, it is understood that other configurations can be used for introducing the insert 102 into the opening 114. For example, in alternate embodiments, the insert housing can be made of at least two separate parts configured to be joined together and secured around the insert.

Still referring to FIGS. 11 to 16, in some embodiments, the insert housing 104 is configured to securely retain the insert 102 in position so as to allow for the X-ray diffraction measurement to be performed (i.e., for retaining the insert in a substantially immobile position while the X-ray diffraction measurement is performed). In order to retain the insert 102 in position, the insert housing 104 is provided with a retention assembly for retaining the insert 102 in the opening 114. In some embodiments, all or part of the retention assembly can be supported by the first surface 108. Embodiments of the retention assembly will be discussed in further detail below.

Figure 11:
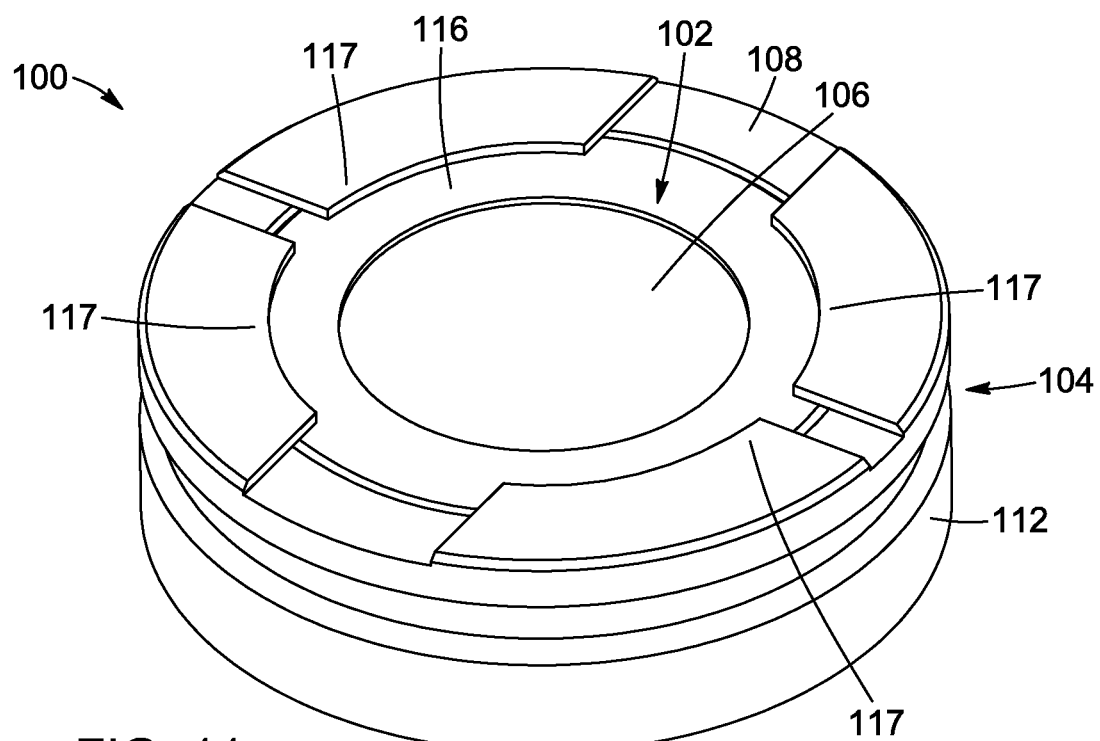
FIG. 11 is a top perspective view of a sample holder including an insert housing and an insert, according to an embodiment.
Figure 12:
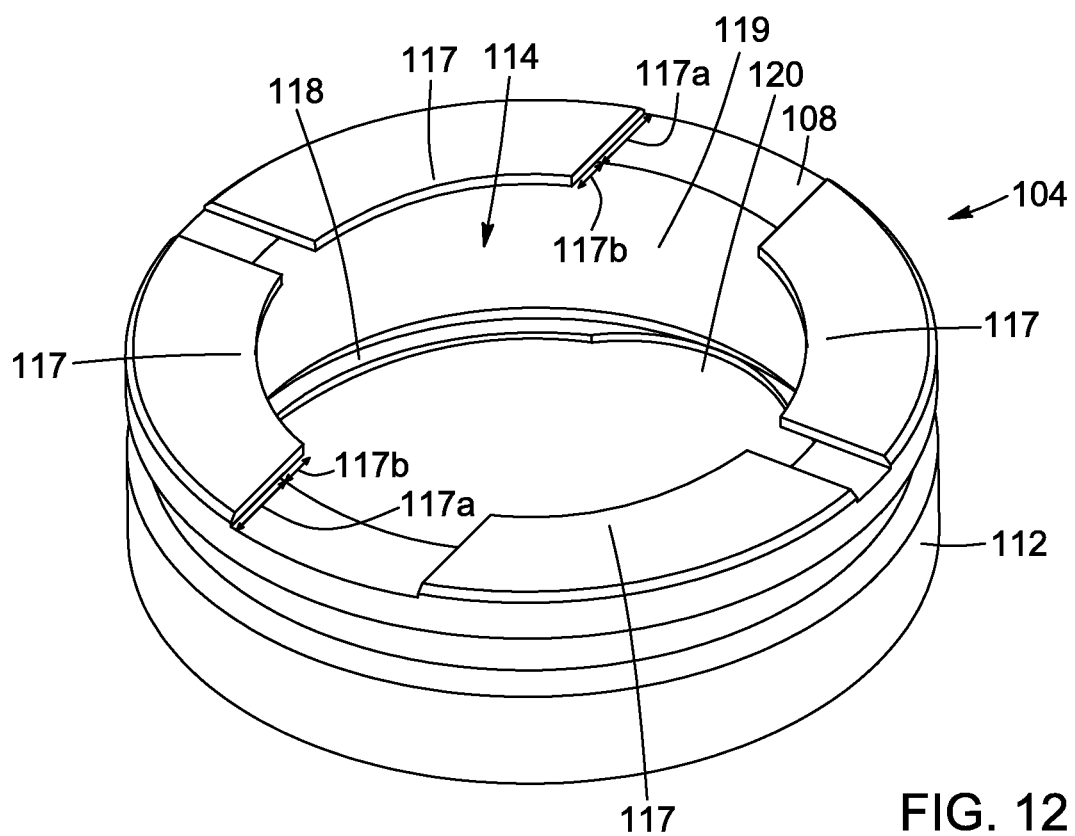
FIG. 12 is a top perspective view of the insert housing of the sample holder of FIG. 11.
Figure 13:
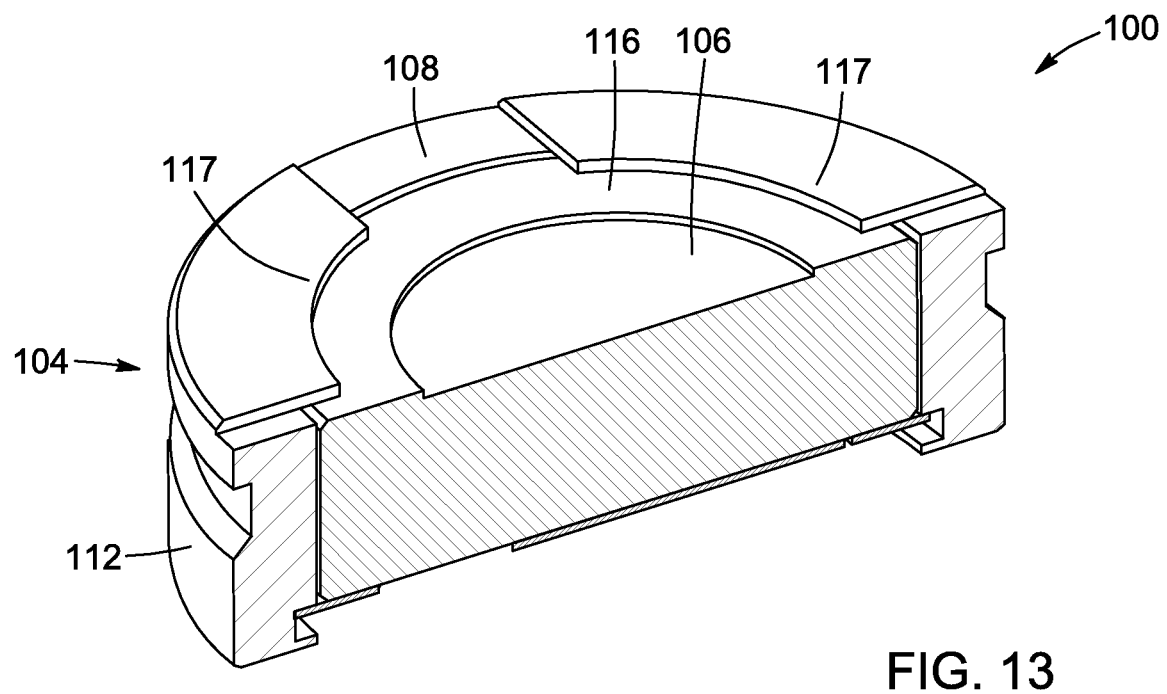
FIG. 13 is a partial top perspective cross-sectional view of the sample holder of FIG. 11.
Figure 14:
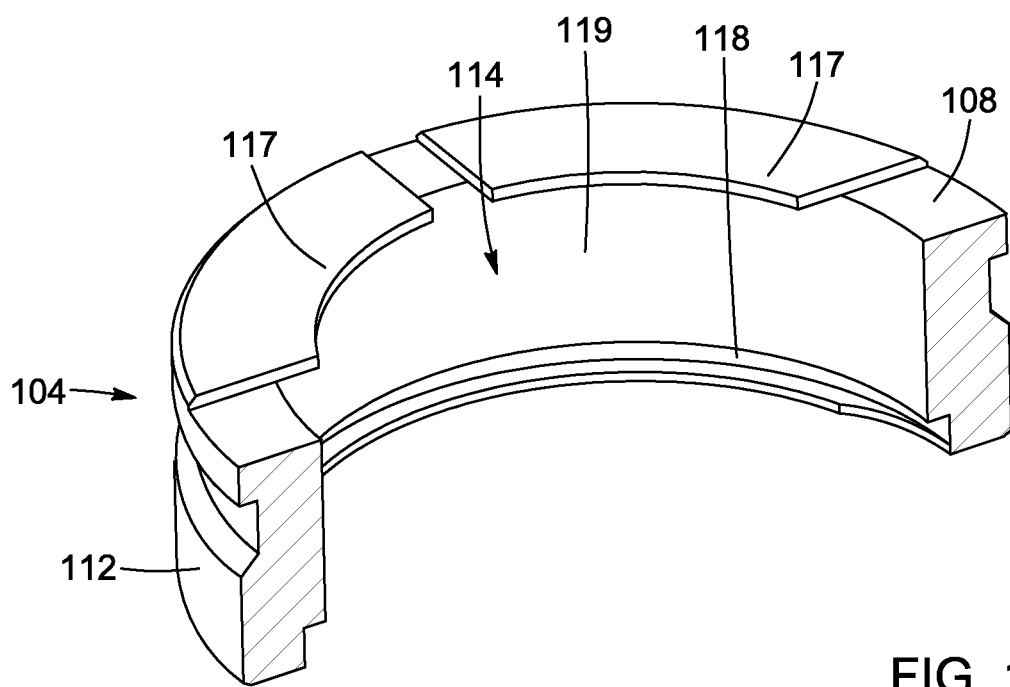
FIG. 14 is a partial top perspective view of the insert housing of FIG. 12.
Figure 15:
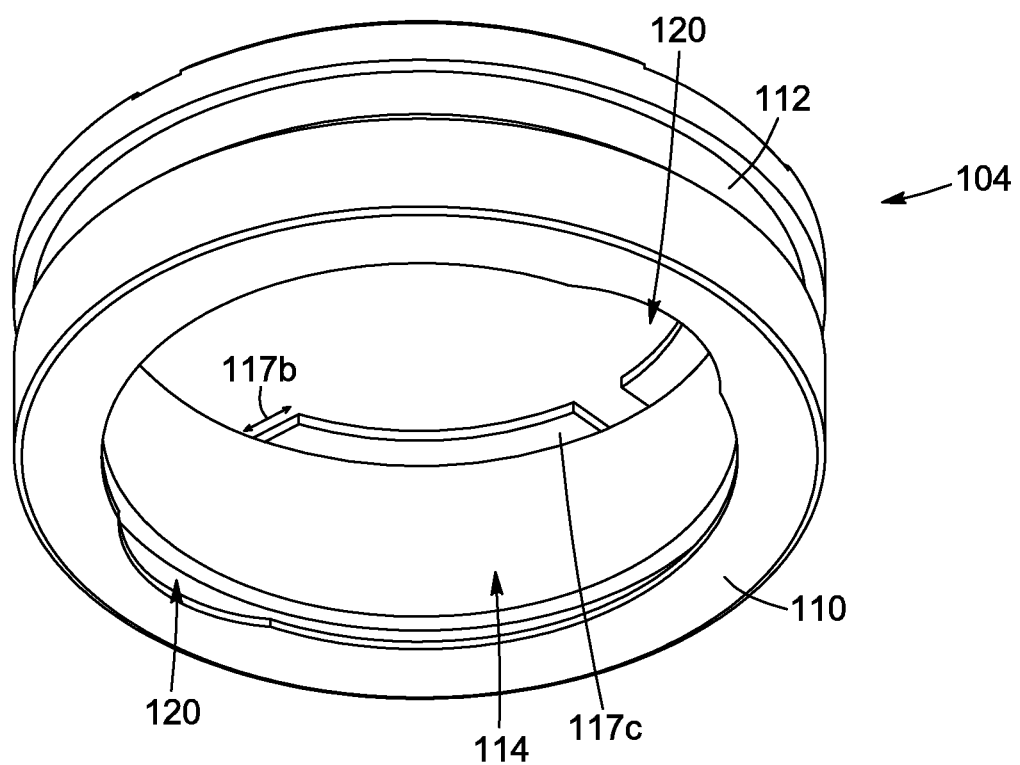
FIG. 15 is a bottom perspective view of the insert housing of FIG. 12.
Figure 16A:
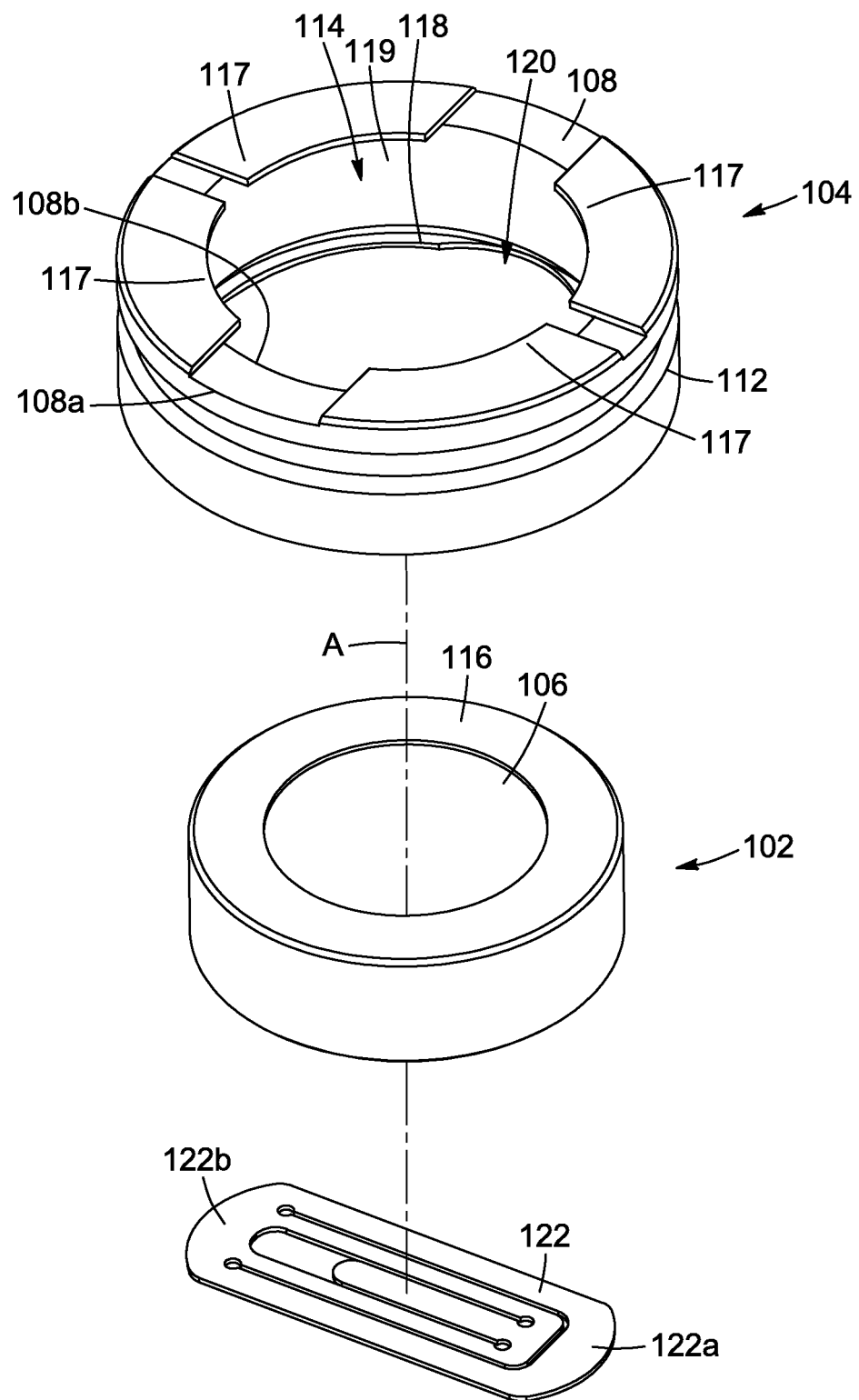
FIG. 16a is an exploded view of the sample holder of FIG. 11.
Figure 16B:
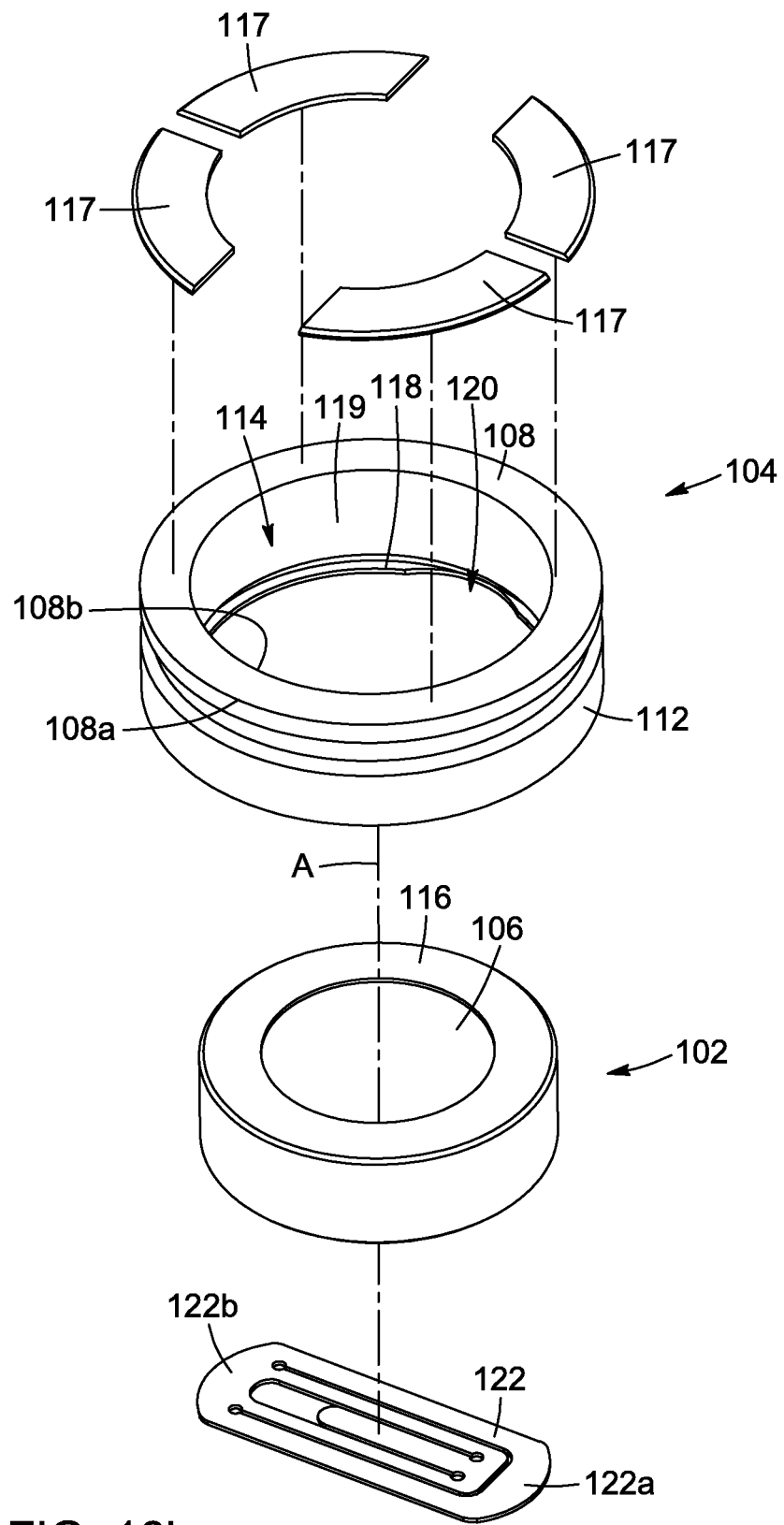

Now referring to FIGS. 11, 13 and 16, in some embodiments, the insert 102 has an upper surface 116 and a sample space 106 onto which a sample (not shown) is positionable for exposure to an X-ray beam. In some embodiments, the upper surface 116 can completely surround the sample space 106, and the sample space 106 can be located in a substantially central area of the upper surface 116. In some embodiments, the sample space 106 includes a depression defined in the upper surface 116. It is understood that the size, shape and location of the depression may vary, depending on the configuration of the insert housing, and on the nature, form and quantity of sample to be analyzed. For example, when the sample to be analyzed is a powder, the user can select a sample space 106 (i.e., select an insert 102 having a certain sample space 106) having a small depth (e.g., between 0.2 mm and 1 mm) and fill the sample space 106 with the powder such that the top of the powder deposit is substantially flush with the upper surface 116.

Figure 17:
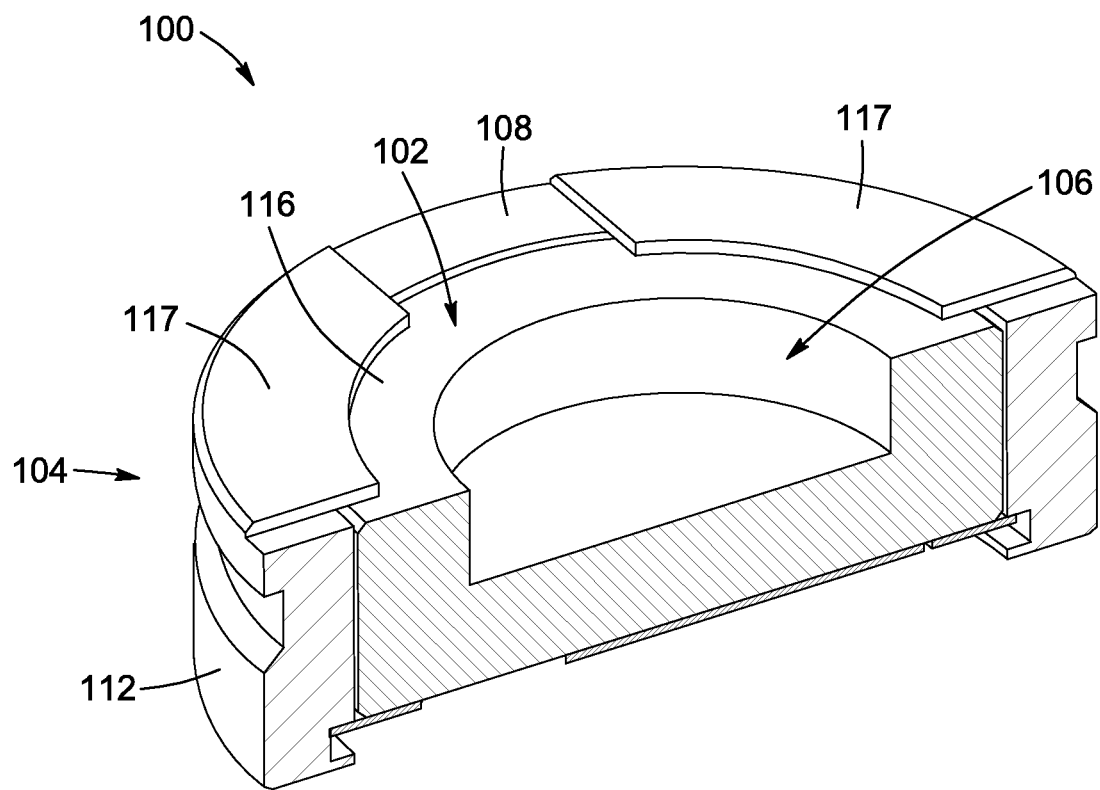
FIG. 17 is a top perspective view of a sample holder including an insert housing and an insert having a deep depression, according to another embodiment.

Alternatively, and now referring to FIG. 17, when the sample to be analyzed has a larger dimension (e.g., a metallic piece or a chunk of mineral), the user can select a sample space 106 having a greater depth (e.g., up to 10 mm). The greater depth can allow for directly submitting large samples to X-ray diffraction analyses without the need to scrape off small amounts of material from the sample, or otherwise damage the sample.

Now referring to FIGS. 11 to 16 and 20, the retention assembly can include flange members 117 against which the insert 102 can be abutted, and a biasing assembly for biasing the insert against the flange members 117. In the embodiment shown, the flange members 117 are arranged along a circumference of the insert housing 104. Each one of the flange members 117 includes a first portion 117a provided on the first surface 108, and a second portion 117b (i.e., an overhang portion) extending from the inner edge 108b of the first surface 108 to above the opening 114. In order to retain the insert 102 in a substantially immobile position in the opening 114, part of the upper surface 116 of the insert 102 can be abutted against the flange members 117, for example against a bottom surface 117c of the second portion 117b of the flange members 117. The flange members 117 can have a thickness 117d which is chosen depending on the material used and the length of the flange members, such that the insert 102 is securely held in position. In some embodiments, the flange members 117 can be made of the same material as the insert housing so long as the material is suitable for securely holding the insert 102 in position.

It is understood that the size, shape and location of the flange members 117 can vary. It is also understood that the thickness 117d, the length of the first portion 117a, the length of the second portion 117b and the area of the bottom surface 117c can vary. For example, the first portion 117a can span from the outer edge 108a of the first surface 108 to the inner edge 108b of the first surface 108, as seen in FIGS. 11 to 16 and 20. In alternate embodiments, for example as shown on FIGS. 21 and 23, the first portion 117a does not span the entire width of the first surface 108.

In some embodiments, the retention assembly includes a biasing assembly for biasing the insert 102 against the flange members 117 (e.g. against the bottom surface 117c of the flange members 117). In the embodiment shown on FIGS. 11 to 16, the biasing assembly includes a groove 118 provided between the second surface 110 and an inner portion 119 of the sidewall 112, recesses 120 provided in the second surface 110, and a biasing clip 122 having two opposed ends 122a, 122b. The biasing clip 122 is removably engageable with the groove 118 by inserting each of the opposed ends 122a, 122b in one of the corresponding recesses 120. The groove 118 is sized and shaped such that rotating the biasing clip 122 about axis A while the biasing clip 122 is engaged in the groove 118 biases the insert 102 against the flange members 117. In the embodiment shown, the biasing clip 122 is rotated 90° in order to bias the insert 102 against flange members 117, but it is understood that the insert housing can be configured so that other rotation angles may be used. It is also understood that other types of biasing assemblies may be used to bias the insert 102 against flange members 117. For example, the biasing assembly can include a spring or a plurality of springs for biasing the insert 102 against flange members 117.

In some embodiments, the flange members 117 are positioned with respect to one another so as to define at least one channel. Each of the at least one channel extends from a first portion of the outer edge located on one side of the sample space 106 to a second portion of the outer edge which is located on an opposite of the sample space 106. The biasing assembly biases at least part of the upper surface 116 of the insert 102 against the flange members 117 such that the upper surface 116 is flush with the first surface. This provides an unobstructed path along each of the at least one channel, which can allow an X-ray beam to be directed towards and reflected off the sample at low reflection angles, such as angles between 0° and 3°. It should be understood that the term "flush", when used to describe the positioning of two surfaces with respect to one another, means that the two surfaces are substantially leveled, for example with a margin of error of about ±10 micron.

In the embodiment shown on FIGS. 11 to 16 and 20, four flange members 117 are provided on the first surface 108. Each flange member 117 is shaped as an annular sector. The first portion 117a of each flange member 117 spans across the first surface 108, from the outer edge 108a to the inner edge 108b, and the second portion 117b extends from the first portion 117a to above the opening 114. In the embodiment shown, the flange members 117 have a thickness of about 0.5 mm, and are elevated with respect to the first surface 108. As can be seen on FIG. 20, the flange members 117 are spaced apart on the first surface 108 so as to define a first channel 124 and a second channel 126 orthogonal to the first channel 124. The first channel 124 extends from a first portion 128 of the outer edge 108 to a second portion 128' of the outer edge 108 opposite to the first portion 128. Similarly, the second channel 126 extends from a first portion 130 of the outer edge 108 to a second portion 130' of the outer edge 108. When the insert 102 is biased against the flange members 117, the upper surface 116 of the insert is flush with the first surface 108, which creates an unobstructed path along each one of the channels 124, 126. It is understood that in other embodiments, the second channel is not necessarily orthogonal to the first channel.

Figure 21:
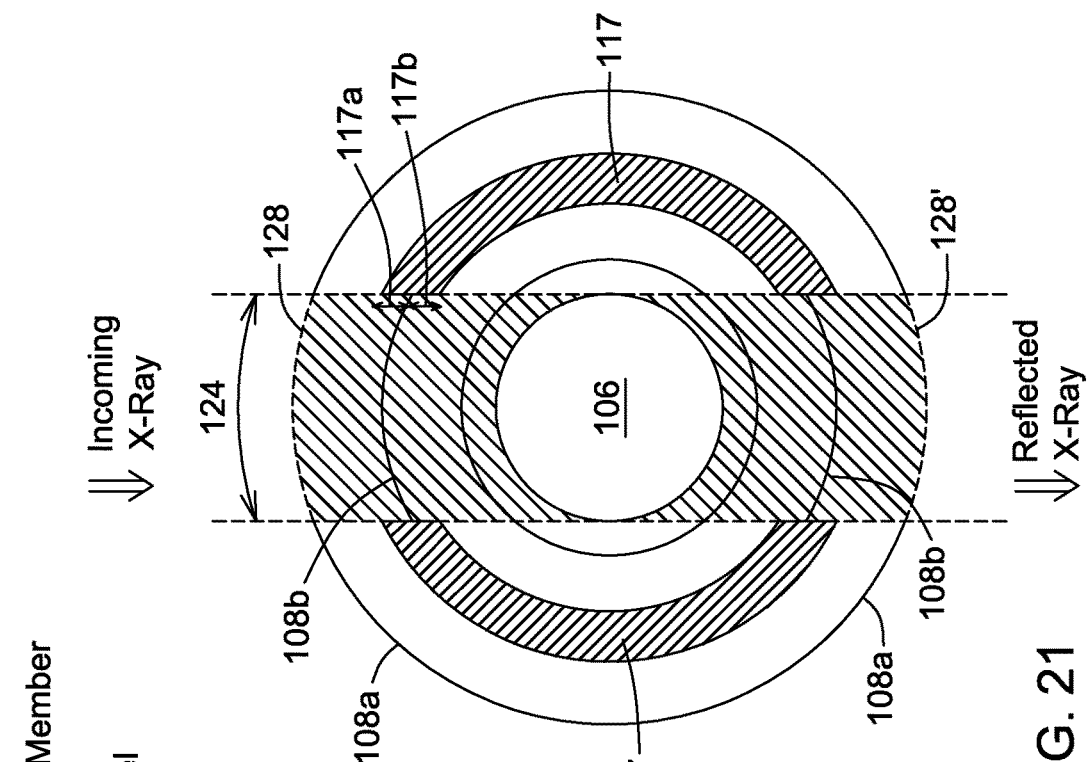
FIG. 21 is a top plan view of a sample holder including two flange members, according to another embodiment.

Now referring to the embodiment shown on FIG. 21, two flange members 117 are provided on the first surface 108. Each flange member 117 is shaped as an annular sector. The first portion 117a of the flange members 117 extends from inner edge 108b and covers a portion of the first surface 108, but does not reach the outer edge 108a. The second portion 117b extends from the first portion 117a to above the opening 114. The flange members 117 are spaced apart on the first surface 108 so as to define a channel 124. The channel 124 extends from a first portion 128 of the outer edge 108 to a second portion 128' of the outer edge 108 opposite to the first portion 128. When the insert 102 is biased against the flange members 117, the upper surface 116 of the insert is flush with the first surface 108, which creates an unobstructed path along the channel 124.

Now referring to the embodiment shown on FIG. 22, four flange members 117 are provided on the first surface 108 to define the channel 124 as discussed above, and two secondary flange members 134 are provided on the first surface 108. In some scenarios, the secondary flange members 134 can provide additional stability to the insert 102.

Now referring to the embodiment shown on FIG. 23, two flange members 117 are provided on the first surface 108. In this embodiment, the portion of the first surface 108 which is not covered by the flange members 117 is larger than the portion of the first surface 108 which is covered by the flange members 117. The flange members 117 are positioned with respect to one another such that the width of the unobstructed path defined by the channel 124 is wider when closer to an outer edge 108a of the first surface 108.

Referring to FIGS. 20 to 23, the channel 124 is defined along a projection path of an X-ray beam emitted from the X-ray diffraction apparatus and reflected off a sample placed in the sample space 106. As the channel 124 is unobstructed, the incident and reflection angles of the X-ray beam can be lowered (for example lowered to between 0° and 3°) without being blocked or hindered by the flange members. This configuration can allow performing low-angle X-ray diffraction analyses while reducing background noise and keeping the sample in a suitable position (i.e., substantially immobile with respect to the insert housing) to be analyzed.

Figure 18:
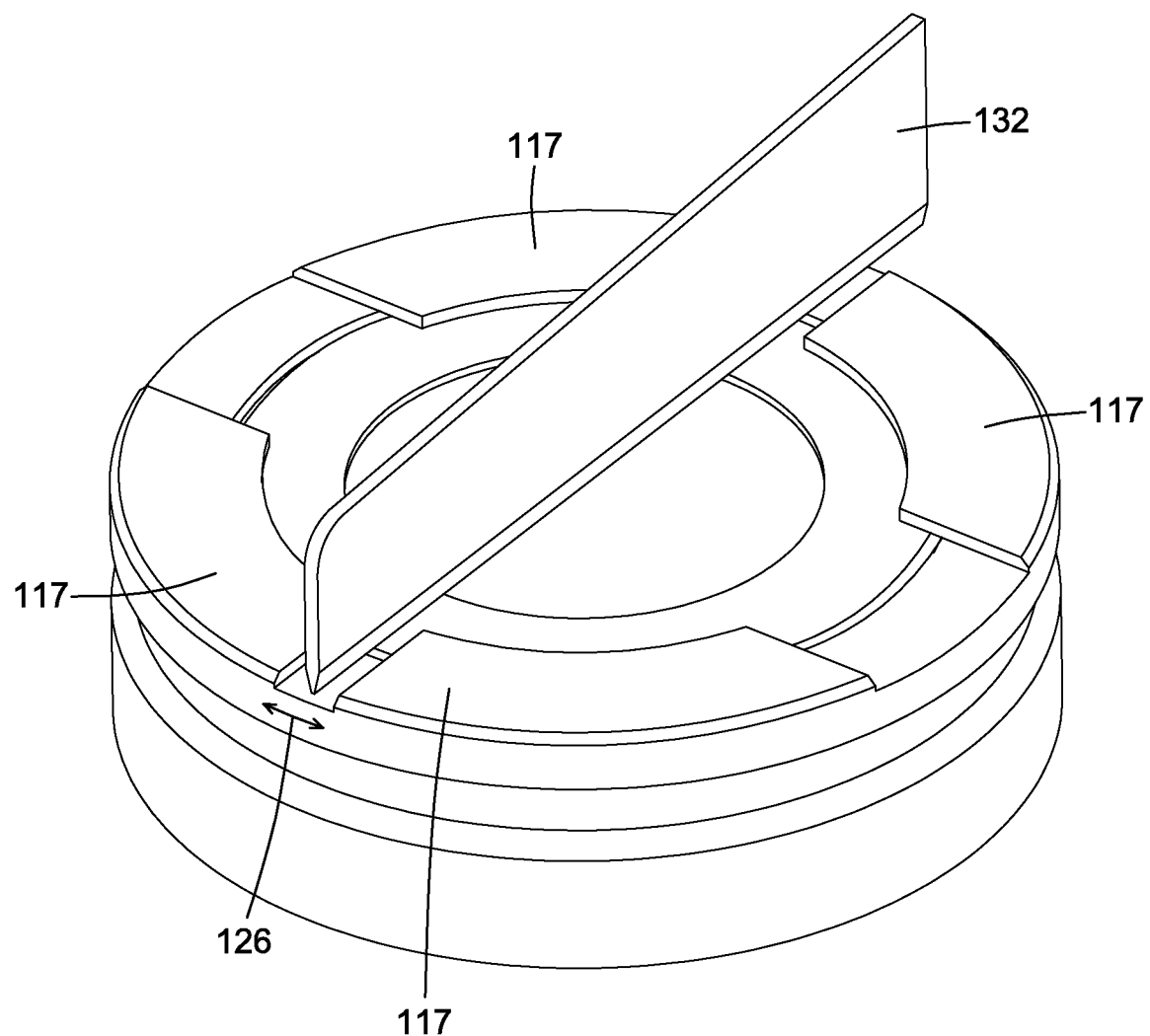
FIG. 18 is a top perspective view of the sample holder of FIG. 11, provided with an anti-scatter baffle.
Figure 20:
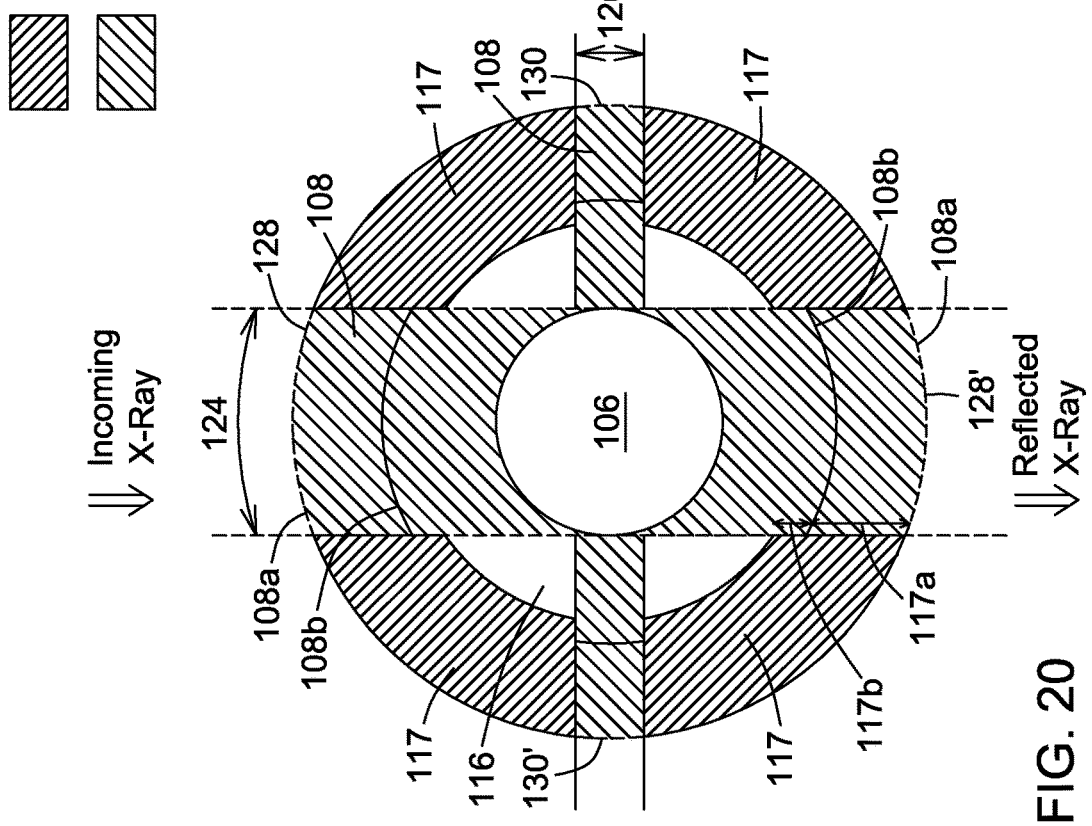
FIG. 20 is a top plan view of the sample holder of FIG. 11, showing the configuration of the flange members.

Now referring to the embodiment shown on FIGS. 18 and 20, the second channel 126 enables an anti-scatter baffle 132 to be positioned to a height which is lower than the thickness of the flange members 117. The anti-scatter baffle 132, also referred to as an anti-scatter "knife edge" or "blade", may be useful for limiting or blocking diffracted X-ray from all but the directions associated with the sample being tested, thereby helping to improve the signal-to-noise ratio of the detected signal. As it can be advantageous to position the anti-scatter baffle 132 as close as possible to the sample, this configuration can allow further improving the signal-to-noise ratio. In some embodiments, the anti-scatter baffle 132 is attached to the frame of the X-ray diffractometer and can be lowered down close to the sample space. The anti-scatter baffle 132 can be made of any material which is dense (or heavy) and does not fluoresce, such as tungsten.

In some embodiments, the flange members 117 and the first surface 108 form an integral structure (i.e., the flange members 117 and the first surface 108 can be a one-piece structure). In other embodiments, the flange members 117 and the first surface 108 are separate pieces and the flange members 117 can be affixed to the first surface 108 using a fastener. For example, the flange members 117 can be bolted or screwed onto the first surface 108.

In order to fulfill the focusing conditions required to conduct an X-ray diffraction measurement at different diffraction angles, the angle between the sample and the incident beam is typically modified during the course of the measurement. This can typically be achieved in several ways, such as
  (i) fixed source, rotating sample, moving detector (θ/2θ mode);
  (ii) fixed sample, moving source, moving detector (θ/θmode); or
  (iii) fixed detector, moving source, rotating sample (2θ/θ mode).

For conducting a measurement in the θ/θ mode using the sample holder of the present description, it is understood that the sample holder can be kept in a fixed position (so that the sample placed in the sample space is in a fixed position) and that the X-ray source can be aligned such that the path of the incoming X-ray beam and the path of the reflected X-ray beam passes above the channel. In other words, such that the projection of the incoming X-ray beam and the projection of the reflected X-ray beam is in the plan defined by the first surface 108 of the insert housing 104 and the upper surface 116 of the insert 102. With this configuration, measurements at low diffraction angles (such as between 0° and 3°) can be performed, as the X-ray beams are not obstructed by the flange members 117.

For conducting a measurement in the 2θ/θ mode or θ/2θ mode, it is understood that the sample holder can be rotated about axis A (so that the sample placed in the sample space rotates). In such case, measurements at low diffraction angles (such as between 0° and 3°) can be performed for certain rotation angles, for example when the projection path of the incoming and reflected X-ray beams is unobstructed (i.e., is in the plan defined by the first surface 108 of the insert housing 104 and the upper surface 116 of the insert 102). For measurements in the 2θ/θ mode or θ/2θ mode, the thickness of the flange members can be chosen to be as small as possible while being thick enough to securely retain the insert, so as to allow limiting the obstruction of the incoming and reflected X-ray beams by the flange members 117.

In some embodiments and as described herein, the insert 102 can be made of a plastic material. In some embodiments, the upper surface 116 of the insert 102 can be made of a polymer selected from the group consisting of amorphous PVC. In some embodiments, the insert 102 is a one-piece structure made of such an amorphous polymer. It has been found that using amorphous PVC can lower the scattering of the X-ray, which can in turn reduce background noise.

In order to identify a substance using powder X-ray diffraction, comparison of the diffraction pattern of a sample with the diffraction pattern of a known standard reference compound can be performed. The X-ray diffraction pattern of the standard reference is typically recorded separately from the sample to identify (i.e., prior to or after recording the X-ray diffraction pattern of the sample to identify). This can require dismounting the sample holder from the X-ray diffraction apparatus, taking the insert out of the insert housing and cleaning or replacing the insert prior to performing a second separate measurement. It has been found that the insert 102 can be configured so as to reduce the number of measurements performed, for example by recording the X-ray diffraction pattern of the sample and the standard reference substance at the same time. Possible configurations are discussed in further detail with reference to FIGS. 24 and 25 below.

Figure 25:
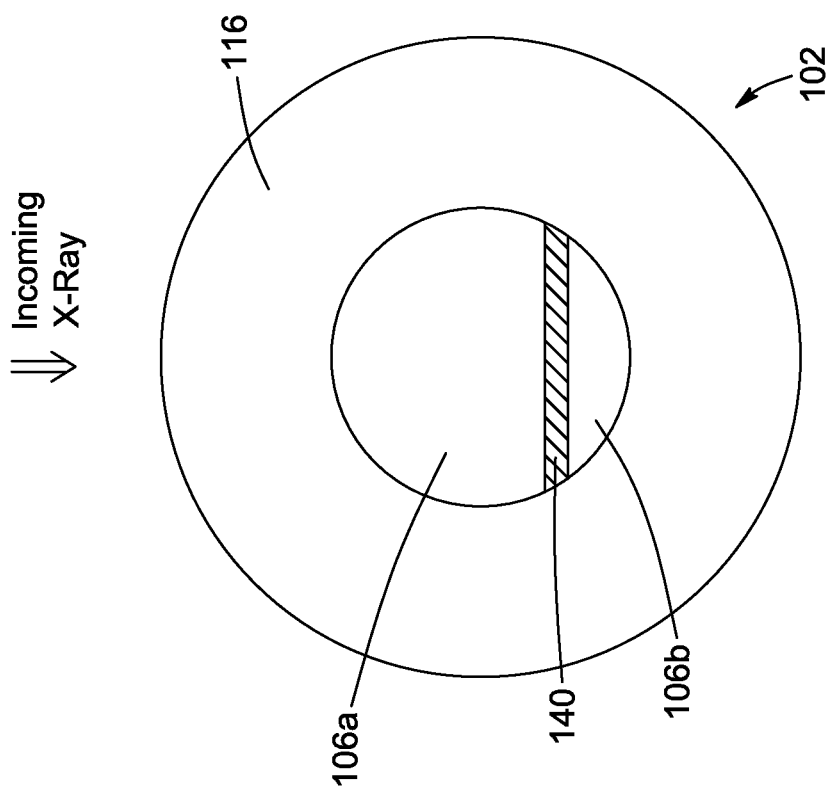
FIG. 25 is a partial top plan view of an insert having a sample space and a standard reference space, according to yet another embodiment.
Figure 24:
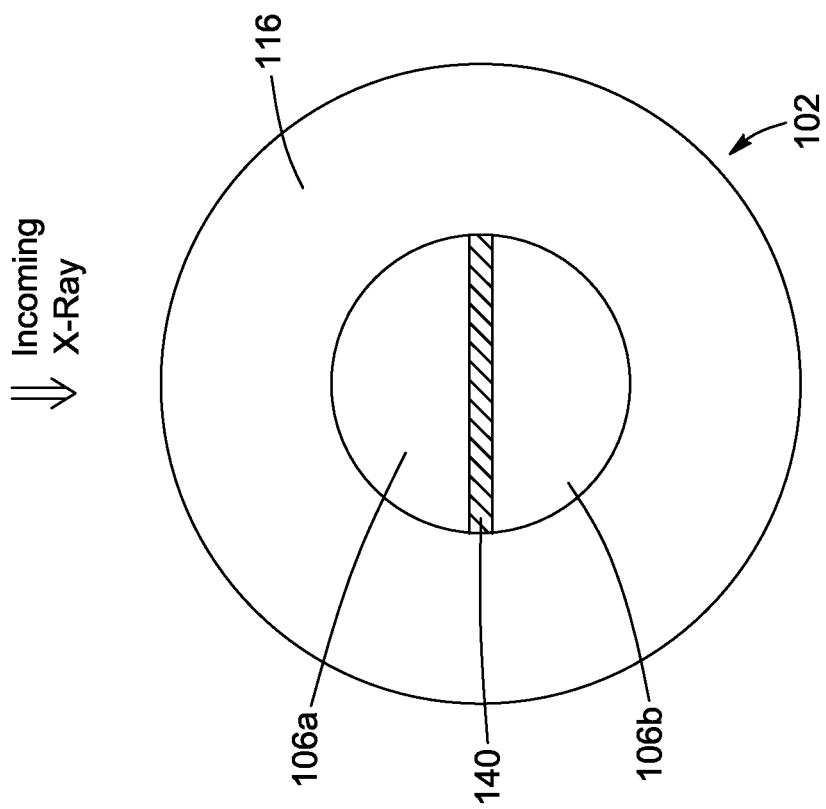
FIG. 24 is a partial top plan view of an insert having a sample space and a standard reference space, according to yet another embodiment.
Figure 26:
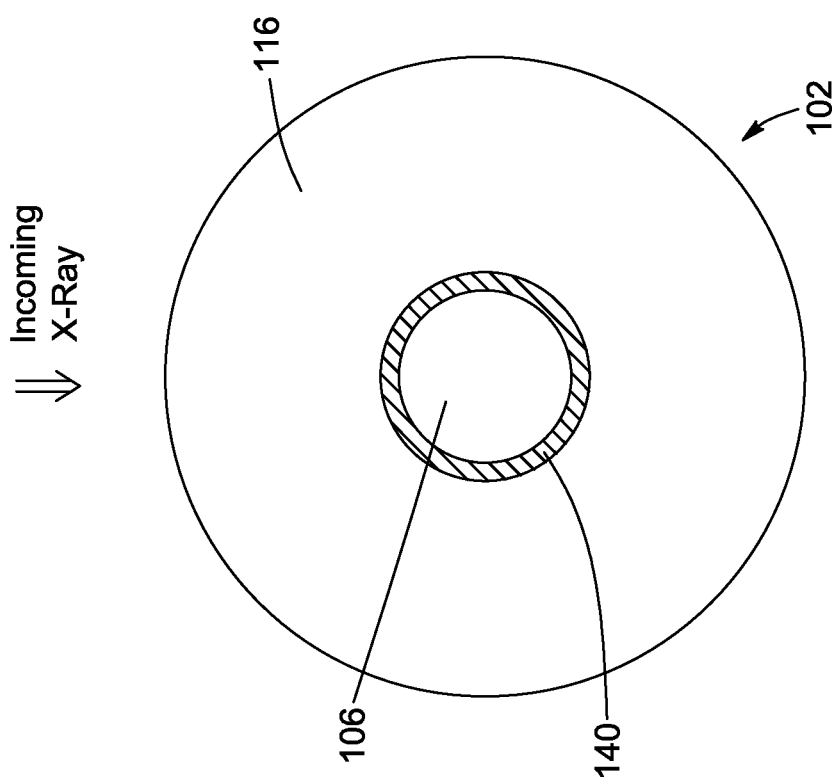
FIG. 26 is a partial top plan view of an insert having a sample space and a circular standard reference space, according to yet another embodiment.

Now referring to FIGS. 24 to 26, in some embodiments, a sample space 106 for holding a sample to be analyzed and a standard reference space 140 for holding a reference substance can both be defined in the upper surface 116 of the insert 102. It is understood that the sample space 106 and the reference space 140 are separate spaces defined in the upper surface 116 and can both be simultaneously or consecutively exposed to the X-ray beam when the X-ray diffraction apparatus is operated. In some scenarios, the standard reference space 140 can be embodied by a space which can removably receive a standard reference substance therein. In other scenarios, the standard reference space 140 can be embodied by a protuberance which has a top surface flush with the upper surface of the insert, and which has a standard reference substance embedded therein. For example, the protuberance can be made of the same material as the insert and have the standard reference substance embedded therein.

In the embodiment shown on FIG. 24, the circular sample space 106 is divided into a first semi-circular sample space 106a and a second semi-circular sample space 106b. The sample to be analyzed can be placed in the semi-circular sample spaces 106a and 106b. In some embodiments, the standard reference space 140 can be a rectangular strip provided between the semi-circular sample spaces 106a and 106b. In such case, a standard reference substance can be placed in the standard reference space 140, such that the top of the standard reference substance is leveled with the top of the sample placed in the sample spaces 106a, 1065b. In other embodiments, the standard reference space 140 can be a rectangular protuberance which contains the standard reference substance. For example, the rectangular protuberance can be made of the same material as the insert and the standard reference substance can be embedded within the standard reference space. In such case, the rectangular protuberance is configured such that its top surface is flush with the upper surface of the insert. The X-ray diffraction pattern of both the sample and the standard reference substance can be recorded simultaneously.

In the embodiment shown on FIG. 25, the standard reference space 140 is positioned such that the circular sample space 106 is divided into two uneven circle segments 106a (minor segment) and 106b (major segment). In the embodiment shown on FIGS. 16a and 16b, the standard reference space 140 is an annulus provided around the sample space 106. It is understood that the size, shape and relative positioning of the standard reference space 140 and the sample space 106 can vary.

It is appreciated that features of one of the above described embodiments can be combined with the other embodiments or alternative thereof.

Moreover, although the embodiments of the sample holder, insert housing, insert and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the sample holder, insert housing, and insert of the present description.

It will further be understood that the mounting sample and the sample holder presented in the current description could either be use on their own or in combination. More particularly, the sample holder could be mounted to the mounting system so as to obtain a "universal sample assembly". Such configurations may be practical in the context of performing reliable measurements, for example measurements requiring both a high-precision positioning of attachment(s) for X-ray apparatus and/or for conducting measurements at very low reflection angles. The above described embodiments of the mounting system may hence be combined with embodiments of the sample holder.

Several alternative embodiments and examples have been described and illustrated herein. The embodiments described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. The present examples and embodiments, therefore, are to be considered in all respects as illustrative and not restrictive. Accordingly, while specific embodiments have been illustrated and described, numerous modifications come to mind without significantly departing from the scope defined in the appended claims.

The invention claimed is:

1. A method for mounting a mounting system onto an X-ray diffraction apparatus, the method comprising:
    defining a mounting position;
    providing a mounting bracket proximate the mounting position;
    rotatably mounting the mounting bracket to the X-ray diffraction apparatus;
    affixing the mounting bracket to the X-ray diffraction apparatus;
    providing an attachment module engageable with the mounting bracket;
    engaging the attachment module with the mounting bracket;
    interlocking the attachment module and the mounting bracket;
    defining a reference position; and
    adjusting an attaching position of the attachment module with respect with the reference position.

2. The method of claim 1, wherein the step of affixing the mounting bracket to the X-ray diffraction apparatus comprises mechanically rigidly connecting the mounting bracket with the X-ray diffraction apparatus.

3. A method for aligning an attachment module with a mounting bracket having an abutment structure and being mounted onto an X-ray diffraction apparatus, the method comprising steps of:
    mounting a first attachment module having an attaching element onto the mounting bracket;
    abutting the attaching element to the abutment structure proximate a reference position;
    interlocking the first attachment module to the mounting bracket; and
    adjusting an attaching position of the first attachment module with respect with the reference position.

4. The method of claim 3, wherein the interlocking step comprises engaging a biasing mechanism with the attaching element or the mounting bracket.

5. The method of claim 3, further comprising steps of:
    unlocking the first attachment module from the mounting bracket;
    detaching the first attachment module from the mounting bracket;
    replacing the first attachment module onto the mounting bracket;
    interlocking the first attachment module to the mounting bracket; and
    verifying the attaching position of the first attachment module.

6. The method of claim 5, further comprising steps of:
    detaching the first attachment module from the mounting bracket;
    mounting a second attachment module onto the mounting bracket;
    abutting the second attachment module to the abutment structure proximate the reference position;
    interlocking the second attachment module to the mounting bracket; and
    adjusting an attaching position of the first attachment module with respect with the reference position.

7. The method of claim 6, wherein the interlocking the second attachment module to the mounting bracket step comprises engaging a biasing mechanism with the at least one attaching element or the mounting bracket.

8. The method of claim 7, further comprising steps of:
    unlocking the second attachment module from the mounting bracket;
    detaching the second attachment module from the mounting bracket;
    replacing the second attachment module onto the mounting bracket;
    interlocking the second attachment module to the mounting bracket; and
    verifying the attaching position of the second attachment module.

* * * * *